United States Patent
Martin

(10) Patent No.: US 12,372,107 B2
(45) Date of Patent: Jul. 29, 2025

(54) BONDING CLIPS

(71) Applicant: Hubbell Incorporated, Shelton, CT (US)

(72) Inventor: Evan Ronald Martin, Litchfield, NH (US)

(73) Assignee: HUBBELL INCORPORATED, Shelton, CT (US)

( * ) Notice: Subject to any disclaimer, the term of this patent is extended or adjusted under 35 U.S.C. 154(b) by 616 days.

(21) Appl. No.: 17/789,506

(22) PCT Filed: Dec. 28, 2020

(86) PCT No.: PCT/US2020/067148
§ 371 (c)(1),
(2) Date: Jun. 27, 2022

(87) PCT Pub. No.: WO2021/138253
PCT Pub. Date: Jul. 8, 2021

(65) Prior Publication Data
US 2023/0035829 A1    Feb. 2, 2023

Related U.S. Application Data

(60) Provisional application No. 62/954,753, filed on Dec. 30, 2019.

(51) Int. Cl.
*F16B 5/12*     (2006.01)
*H01R 4/34*    (2006.01)
(Continued)

(52) U.S. Cl.
CPC ............... *F16B 5/121* (2013.01); *H01R 4/34* (2013.01); *H01R 4/38* (2013.01); *H01R 4/64* (2013.01)

(58) Field of Classification Search
CPC .. H02G 3/04; H02G 3/06; F16B 5/121; F16B 5/125; H01R 4/34; H01R 4/38; H01R 4/64
See application file for complete search history.

(56) References Cited

U.S. PATENT DOCUMENTS

| 325,235 A | 9/1885 | Buimer |
| 329,615 A | 11/1885 | Andrews |

(Continued)

FOREIGN PATENT DOCUMENTS

| FR | 769005 | 8/1934 |
| FR | 419768 | 7/1939 |

(Continued)

OTHER PUBLICATIONS

International Preliminary Report on Patentability mailed in PCT/US20/67148 on Jul. 14, 2022 (7 pages).
(Continued)

*Primary Examiner* — Daniel J Wiley
(74) *Attorney, Agent, or Firm* — Wissing Miller LLP

(57) ABSTRACT

Bonding clips used to electrically bond metal structures are provided. The bonding clips include an electrically conductive body, an electrically conductive first leg, an electrically conductive second leg and an electrically conductive mounting member. The first leg has one or more piercing members extending from the first leg in a first direction. The second leg has one or more piercing embers extending from the second leg in a first direction. The one or more piercing members are provided to penetrate protective coatings on metal structures so that the one or more piercing members contact the underlying metal.

23 Claims, 19 Drawing Sheets

(51) Int. Cl.
*H01R 4/38* (2006.01)
*H01R 4/64* (2006.01)

(56) References Cited

U.S. PATENT DOCUMENTS

| | | |
|---|---|---|
| 334,031 A | 1/1886 | Morse |
| 878,476 A | 2/1908 | Barker |
| 1,183,174 A | 5/1916 | Dice |
| 1,724,595 A | 8/1929 | Hyle |
| 1,878,199 A | 9/1932 | Stenger |
| 1,916,526 A | 7/1933 | Olson |
| 2,034,258 A | 3/1936 | Hausser |
| 2,034,494 A | 3/1936 | Stoll |
| 2,069,402 A | 2/1937 | Cowlin |
| 2,084,109 A | 6/1937 | Ribble |
| 2,149,359 A | 3/1939 | Olson |
| 2,179,575 A | 11/1939 | Hosking |
| 2,250,280 A | 7/1941 | Starbird |
| 2,171,732 A | 2/1942 | Chappuis |
| 2,561,679 A | 7/1951 | Waller |
| 2,796,547 A | 6/1957 | Stinger |
| 2,934,684 A | 4/1960 | Fegan |
| 3,042,351 A | 5/1960 | Du Bois |
| 2,946,039 A | 7/1960 | Grunwald |
| 3,138,658 A | 6/1964 | Weimer, Jr. |
| 3,175,462 A | 3/1965 | Disley |
| 3,247,316 A | 4/1966 | Weimer, Jr. |
| 3,285,513 A | 11/1966 | Blakesley |
| 3,340,494 A | 9/1967 | Gutshall |
| 3,388,369 A | 6/1968 | Zalmans |
| 3,481,381 A | 12/1969 | Black |
| 3,504,101 A | 3/1970 | Muto |
| 3,541,226 A | 11/1970 | Cea et al. |
| 3,541,227 A | 11/1970 | Bendrick |
| 3,626,357 A | 12/1971 | Kindell |
| 3,686,609 A | 8/1972 | Hansen |
| 3,719,919 A | 3/1973 | Tibolla |
| 3,761,867 A | 9/1973 | Churla |
| 3,945,704 A | 3/1976 | Kraus |
| 4,022,262 A | 5/1977 | Gunn |
| 4,023,882 A | 5/1977 | Pettersson |
| 4,060,301 A | 11/1977 | Beatty |
| 4,263,474 A | 4/1981 | Tennant |
| 4,406,505 A | 9/1983 | Avarmovich |
| 4,473,714 A | 9/1984 | Brownell et al. |
| 4,498,715 A | 2/1985 | Peppler |
| 4,506,224 A | 12/1985 | Weisenburger |
| 4,659,870 A | 4/1987 | Jones |
| 4,669,803 A | 6/1987 | Kim |
| 4,704,058 A | 11/1987 | Crunwell |
| 4,859,205 A | 8/1989 | Fritz |
| 4,900,209 A | 2/1990 | Reynolds |
| 4,961,712 A | 10/1990 | Schwenk et al. |
| 5,078,613 A | 1/1992 | Salmon |
| 5,100,506 A | 3/1992 | Sturtevant et al. |
| 5,207,588 A | 5/1993 | Ladouceur et al. |
| 5,236,272 A | 8/1993 | Hibbard |
| 5,399,096 A | 3/1995 | Quillet et al. |
| 5,435,746 A | 7/1995 | Leeb |
| 5,441,417 A | 8/1995 | Ladouceur et al. |
| 5,453,027 A | 9/1995 | Buell et al. |
| 5,489,180 A | 2/1996 | Ichihara |
| 5,501,008 A | 3/1996 | Leeb |
| 5,620,290 A | 4/1997 | Homfeldt et al. |
| 5,644,830 A | 7/1997 | Ladouceur et al. |
| 5,681,191 A | 10/1997 | Robicheau |
| 5,828,008 A | 10/1998 | Lockwood et al. |
| 6,106,310 A | 8/2000 | Davis |
| 6,224,288 B1 | 5/2001 | Postma |
| 6,343,904 B1 | 2/2002 | Wang |
| 6,347,915 B1 | 2/2002 | Balzano |
| 6,368,038 B1 | 4/2002 | Uno |
| 6,939,097 B2 | 9/2005 | Carr et al. |
| 6,976,816 B2 | 12/2005 | Slesinski et al. |
| 6,987,660 B2 | 1/2006 | Stevenson et al. |
| 7,468,491 B2 | 12/2008 | Deciry |
| 8,092,129 B2 | 1/2012 | Wiley et al. |
| 8,353,650 B2 | 1/2013 | Wiley et al. |
| 8,608,418 B2 | 12/2013 | Wiley et al. |
| 8,888,431 B2 | 11/2014 | Haney |
| 9,074,616 B2 | 7/2015 | Wiley |
| D740,113 S | 10/2015 | Olenick |
| 9,447,813 B2 | 9/2016 | Wiley |
| 9,500,220 B2 | 11/2016 | Wiley |
| 10,036,414 B2 | 7/2018 | Wiley |
| 10,041,640 B2 | 8/2018 | AbuGhazaleh |
| 10,180,158 B2 | 1/2019 | Wiley |
| 10,655,668 B2 | 5/2020 | Wiley |
| 10,823,221 B2 | 11/2020 | Wiley |
| 2003/0031526 A1 | 2/2003 | Grant |
| 2009/0000220 A1* | 1/2009 | Lenox ............... F24S 25/634 |
| | | 52/173.1 |
| 2014/0261640 A1 | 9/2014 | Andrews |
| 2017/0302220 A1* | 10/2017 | Martin ............... H02S 20/22 |
| 2018/0152012 A1* | 5/2018 | Brouwer ........... H02G 3/0443 |
| 2018/0277964 A1* | 9/2018 | Martin ............... H01R 4/64 |
| 2018/0316307 A1* | 11/2018 | Martin ............... F16B 2/065 |

FOREIGN PATENT DOCUMENTS

| | | |
|---|---|---|
| JP | H06309640 | 11/1994 |
| WO | 2006097600 | 9/2006 |

OTHER PUBLICATIONS

International Search Report and Written Opinion mailed in PCT/US20/67148 on Mar. 10, 2021 (7 pages).

Middle Atlantic Product Sheet "C Series, Cable Ladders and Accessories", Feb. 6, 2012 (9 pages).

MP Husky Cable Tray & Cable Bus Product Sheet "Accessories, Splices and Connectors", 2013 (12 pages.).

* cited by examiner

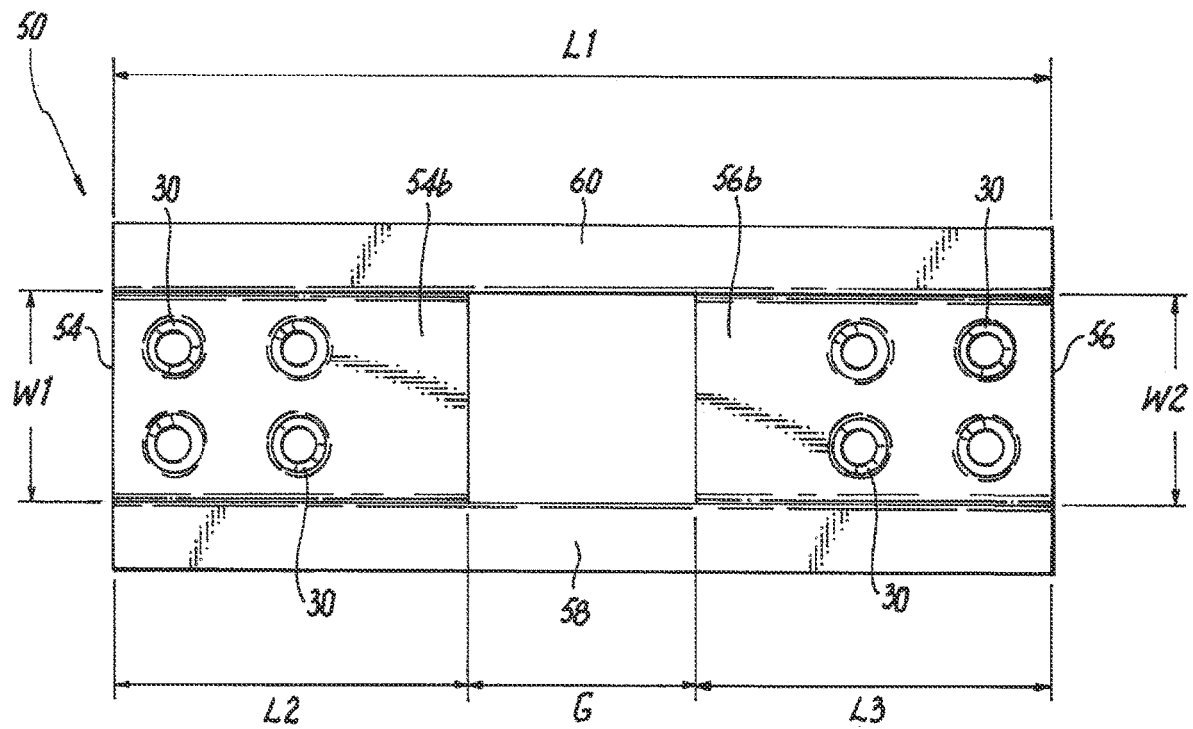
Fig. 19
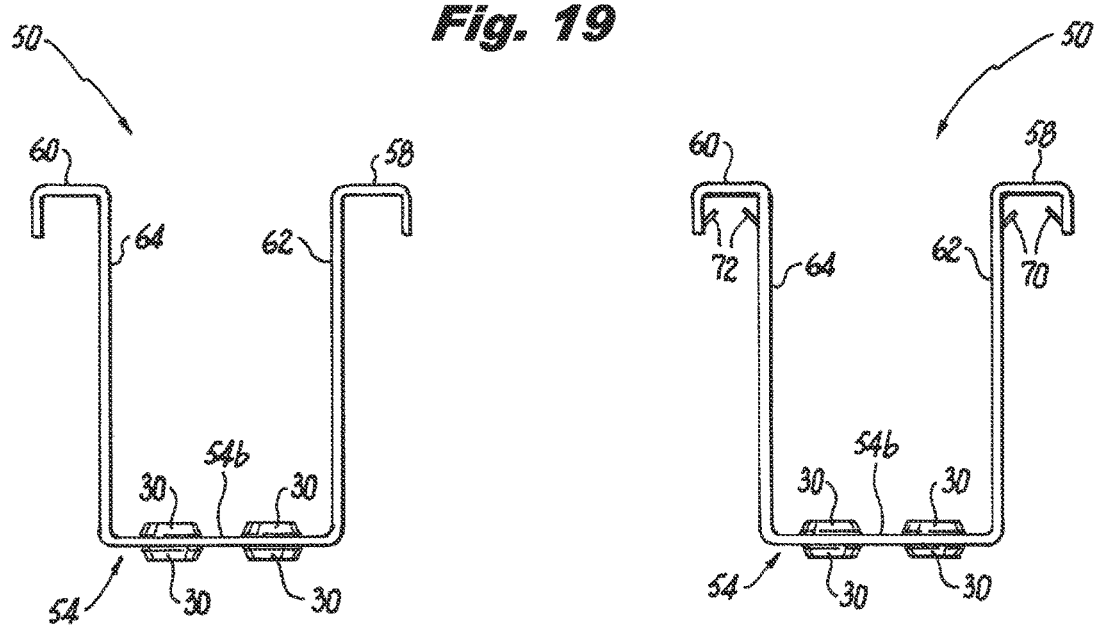
Fig. 20a  Fig. 20b

BONDING CLIPS

CROSS-REFERENCE TO RELATED APPLICATIONS

This application is a 371 of PCT/US2020/067148 filed on Dec. 28, 2020, published on Jul. 8, 2021 under publication number WO 2021/138253 A1, which claims priority benefits from U.S. Provisional Patent Application Ser. No. 62/954,753 filed on Dec. 30, 2019 the contents of both are incorporated herein in their entirety by reference.

BACKGROUND

Field

The present disclosure relates generally to bonding clips, and more particularly to bonding clips used to bond metal structures that are joined together with a metal splice bracket.

Description of the Related Art

Data centers, computer rooms and telecommunication rooms generally include arrays of racks or cabinets arranged in one or more rows with aisles between the rows. Each rack or cabinet houses telecommunication cabling infrastructure and electronic equipment including patch panels, servers, switches, routers, etc. The cabling infrastructure includes cabling that extends between the electronic equipment within the racks or cabinets, cabling that extends between racks in the datacenter, computer room or telecommunication room, and cabling that extends into and out of the datacenter, computer room or telecommunication room. Often, cable management systems in datacenters, computer rooms and telecommunication rooms are mounted overhead and provide cable pathways for routing the cabling. Cable management systems include multiple metal cable tray assemblies that are joined together using metal splice plates. Each cable tray assembly can come in different lengths and they typically include two parallel metal rails with multiple cross-braces. The metal rails are typically suspended from a ceiling, and the cross-braces support the cabling.

The metal cable tray assemblies and splice plates used to support electrical cabling are often coated with a protective, non-conductive material that provides protection from unwanted transfer of electricity or heat and/or protection from environmental conditions. Often, local electrical codes require such metal structures to be bonded as a safety measure. To bond such metal structures, the protective, non-conductive coating has to be removed in order to create an electrically conductive path between an electrical ground conductor and the metal underneath the protective coating. Typically, a technician would have to remove the protective, non-conductive coating by sanding or grinding the protective coating until bare metal is exposed. However, it is a time-consuming process to carefully remove such coating. Further, if an insufficient amount of coating is removed, a suitable electrically conductive path may not be established. These possibilities are exacerbated by the fact that there may be large numbers of cable tray assemblies and splice plates in a datacenter. As a result, the cost and time taken to bond each cable assembly can be significant since it would be time consuming to manually remove the protective, non-conductive coating from the cable tray assemblies and the splice plates.

SUMMARY

The present disclosure provides descriptions of embodiments for bonding clips used to electrically bond metal structures that are joined together with one or more metal splice brackets. In an exemplary embodiment, the bonding clip includes an electrically conductive body having at least one electrically conductive wall, an electrically conductive first leg, an electrically conductive second leg and an electrically conductive mounting member. Each of the at least one walls includes a first side edge, a second side edge, a first end edge and a second end edge. The first leg extends from the first edge of the wall adjacent the first end edge. The first leg has at least one piercing member extending from the first leg in a first direction. In another embodiment, the first leg may include at least one piercing member extending from the first leg in a second direction. The second leg extends from the first edge of the wall adjacent the second end edge. The second leg has at least one piercing member extending from the second leg in the first direction. In another embodiment, the second leg may include at least one piercing member extending from the second leg in the second direction. The second leg is preferably separated from the first leg so that a gap is formed between the first and second legs. The mounting member extends from the second side edge of the wall and may be a U-shaped or J-shaped member that is capable of coupling the bonding clip to the metal structure.

In another exemplary embodiment, the bonding clip includes an electrically conductive body, an electrically conductive first leg, an electrically conductive second leg and an electrically conductive mounting member. The electrically conductive body has at least one electrically conductive wall. Each at least one wall has a first side edge, a second side edge, a first end edge and a second end edge. The electrically conductive first leg extends from the first edge of the at least one wall adjacent the first end edge of the body. The first leg has at least one piercing member extending from the first leg in a first direction and at least one piercing member extending from the first leg in a second direction. The electrically conductive second leg extends from the first edge of the at least one wall adjacent the second end edge of the body. The second leg has at least one piercing member extending from the second leg in the first direction and at least one piercing member extending from the second leg in the second direction. The second leg is separated from the first leg so that a gap is formed between the first and second legs. The electrically conductive mounting member extends from the second side edge of the body, and may be a U-shaped or J-shaped member that is capable of coupling the bonding clip to the metal structure.

In another exemplary embodiment, the bonding clip includes an electrically conductive body having a first side wall, a second side wall, a first leg between the first and second side walls and a second leg between the first and second side walls. The second leg is separated from the first leg so that a gap is formed between the first and second legs. The bonding clip also includes at least one piercing member extending from the first leg of the body in a first direction and/or a second direction, and at least one piercing member extending from the second leg of the body in the first direction and/or a second direction. The bonding clip has a first electrically conductive mounting member extending from the first side wall of the body, and a second electrically conductive mounting member extending from the second side wall of the body.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 19 is a top plan view of the bonding clip of FIG. 17;

FIG. 20a is an end elevation view of the bonding clip of FIG. 17;

FIG. 20b is an end elevation view of another exemplary embodiment of the bonding clip of FIG. 17;

DETAILED DESCRIPTION

The present disclosure provides descriptions of embodiments for bonding clips used to electrically bond metal structures forming cable tray assemblies used to support electrical and/or communication cables in for example datacenters. The bonding clips according to the present disclosure are formed of a conductive material and include one or more piercing members used to pierce or cut through protective, non-conductive coatings on the metal structures. The bonding clips may be fabricated as unitary or monolithic structure, or the bonding clips may be fabricated as separate parts that are joined together by, for example, welded joints.

The metal structures contemplated by the present disclosure include, but are not limited to, metal structures that are joined together using a metal splice bracket. Non-limiting examples of the metal structures include metal rail sections used to form cable tray assemblies and metal spliced brackets used to join the metal rail sections. For ease of description, the metal structures may also be referred to herein as the "structures" in the plural and the "structure" in the singular. The non-conductive materials coated on the metal structures may include oxide, paint, anodization, powder coating, epoxy, and enamels. For ease of description, the protective coating of non-conductive material may also be referred to herein as the "protective coatings" in the plural and the "protective coating" in the singular.

Figure 1:
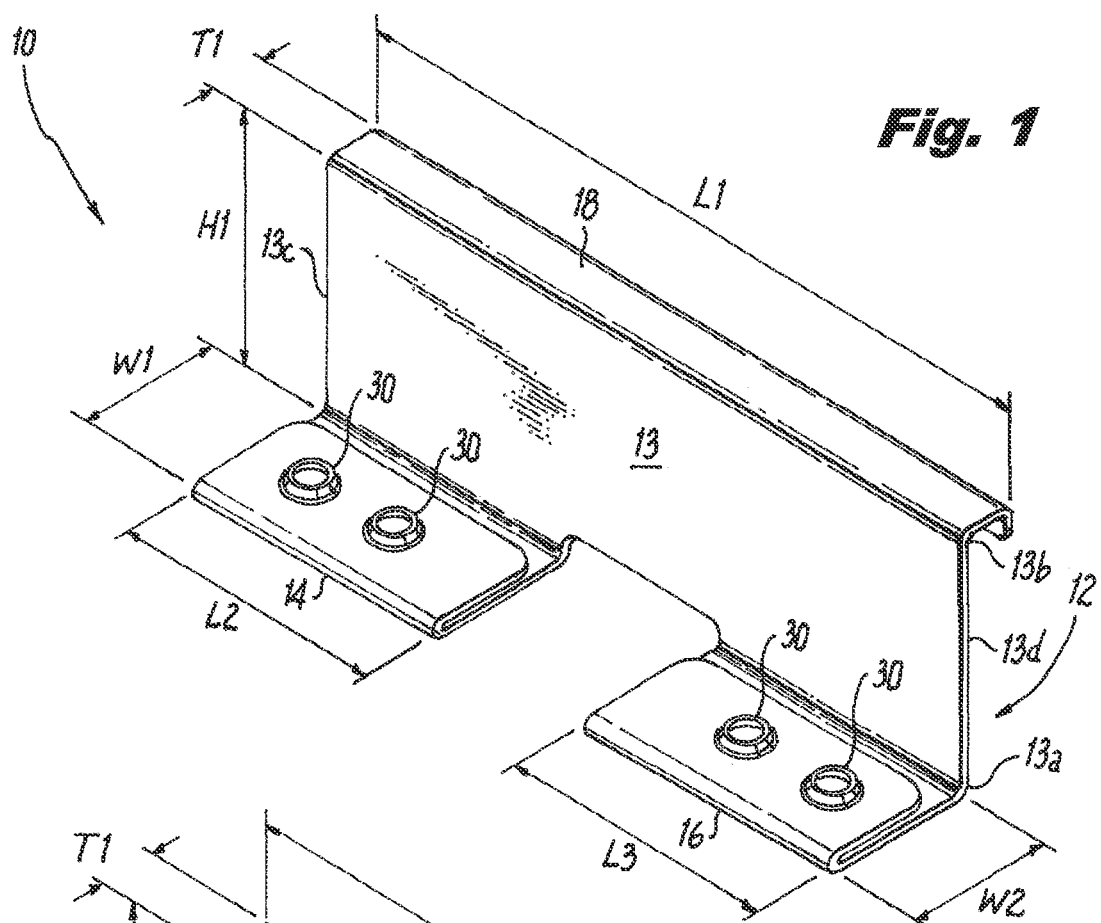
FIG. 1 is a perspective view of an exemplary embodiment of a bonding clip according to the present disclosure.
Figure 2:
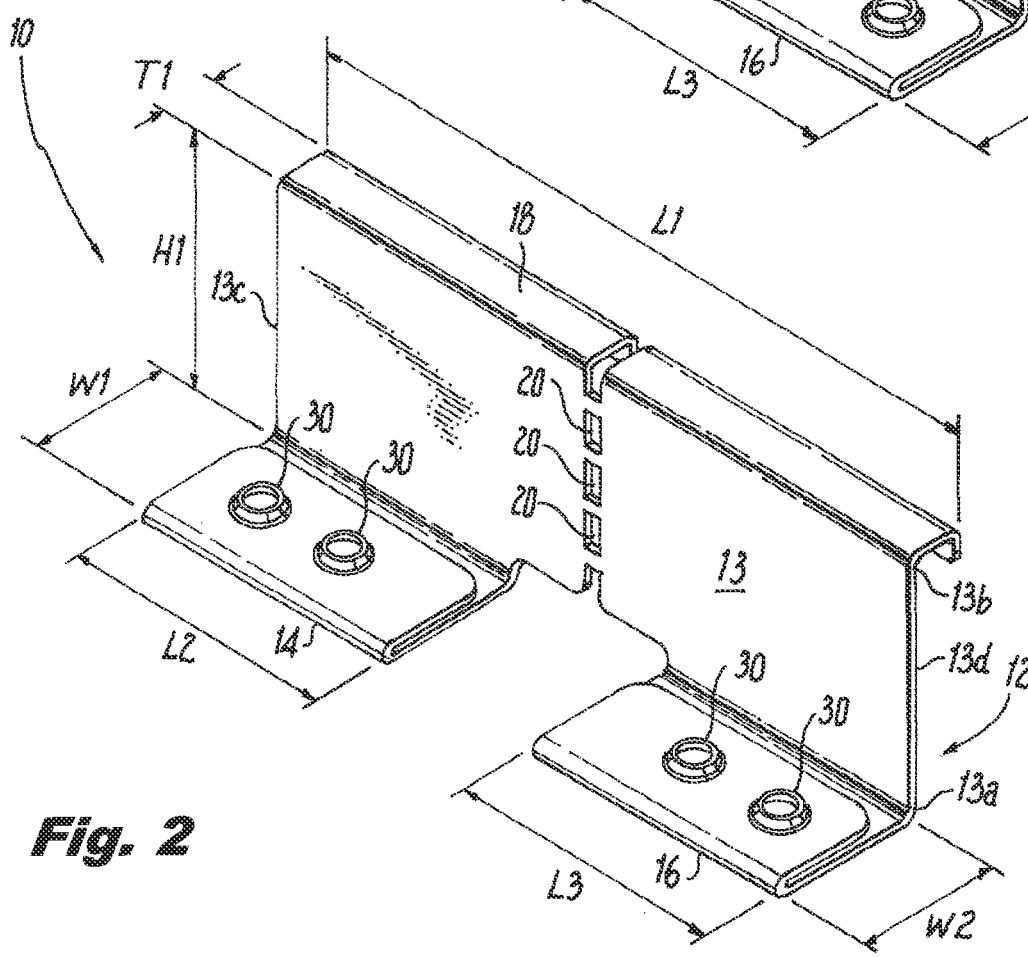
FIG. 2 is a perspective view of another exemplary embodiment of a bonding clip according to the present disclosure.

Referring to FIGS. 1 and 2, exemplary embodiments of bonding clips according to the present disclosure are shown. In the exemplary embodiment of FIG. 1, the bonding clip 10 may be of unitary construction that includes a body 12 having a side wall 13, a first leg 14, a second leg 16 and a mounting member 18. In the exemplary embodiment of FIG. 2, the bonding clip 10 may be of unitary construction that includes a body 12 having a side wall 13, a first leg 14, a second leg 16, a mounting member 18 and perforations 20. The perforations 20 permit the body 12 to be separated into a first clip section 22 and a second clip section 24, seen in FIGS. 3 and 4. As shown in FIG. 4, the first clip section 22 includes a portion 12a of the body 12, the first leg 14 and a portion 18a of the mounting member 18. The second clip section 24 includes a portion 12b of the body 12, the second leg 16 and a portion 18b of the mounting member 18. It is noted that the bonding clip 10 may also be made of separate components joined together with for example, welded joints, mechanical fasteners and/or adhesives.

Continuing to refer to the embodiments of FIGS. 1 and 2, the side wall 13 of the body 12 has a first (or bottom) side edge 13a, a second (or top) side edge 13b, a first end edge 13c and a second end edge 13d. The body 12 has a length "L1" that may be configured and dimensioned to fit within a splice bracket, e.g., splice bracket 212 or 214 seen in FIGS. 11 and 12, used to join metal rails, e.g., rails 204 or 206 seen in FIGS. 11 and 12, of cable tray assemblies 202. For example, the length "L1" of the body 12 can range from about 1 inch to about 6 inches. The body 12 has a height "H1" that may be configured and dimensioned to fit within a splice bracket 212 or 214, seen in FIG. 13. For example, the height "H1" of the body 12 can range from about 0.25 inches to about 1 inch.

Figure 13:
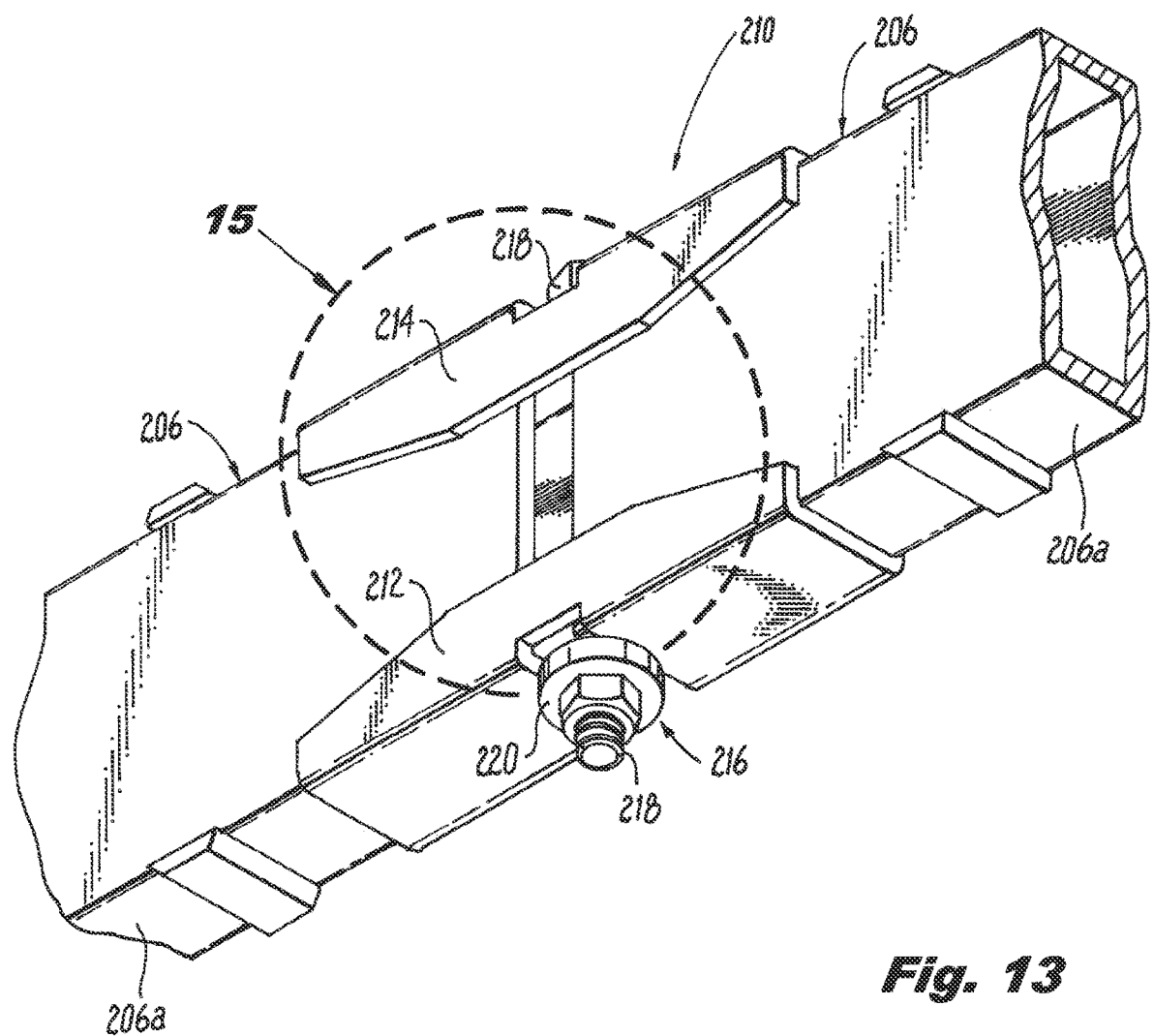
FIG. 13 is an enlarged perspective view of a portion the two metal rails of the cable tray assemblies of FIG. 12 taken from detail 13 and illustrating a butt splice assembly joining rails of the cable tray assemblies.
Figure 14A:
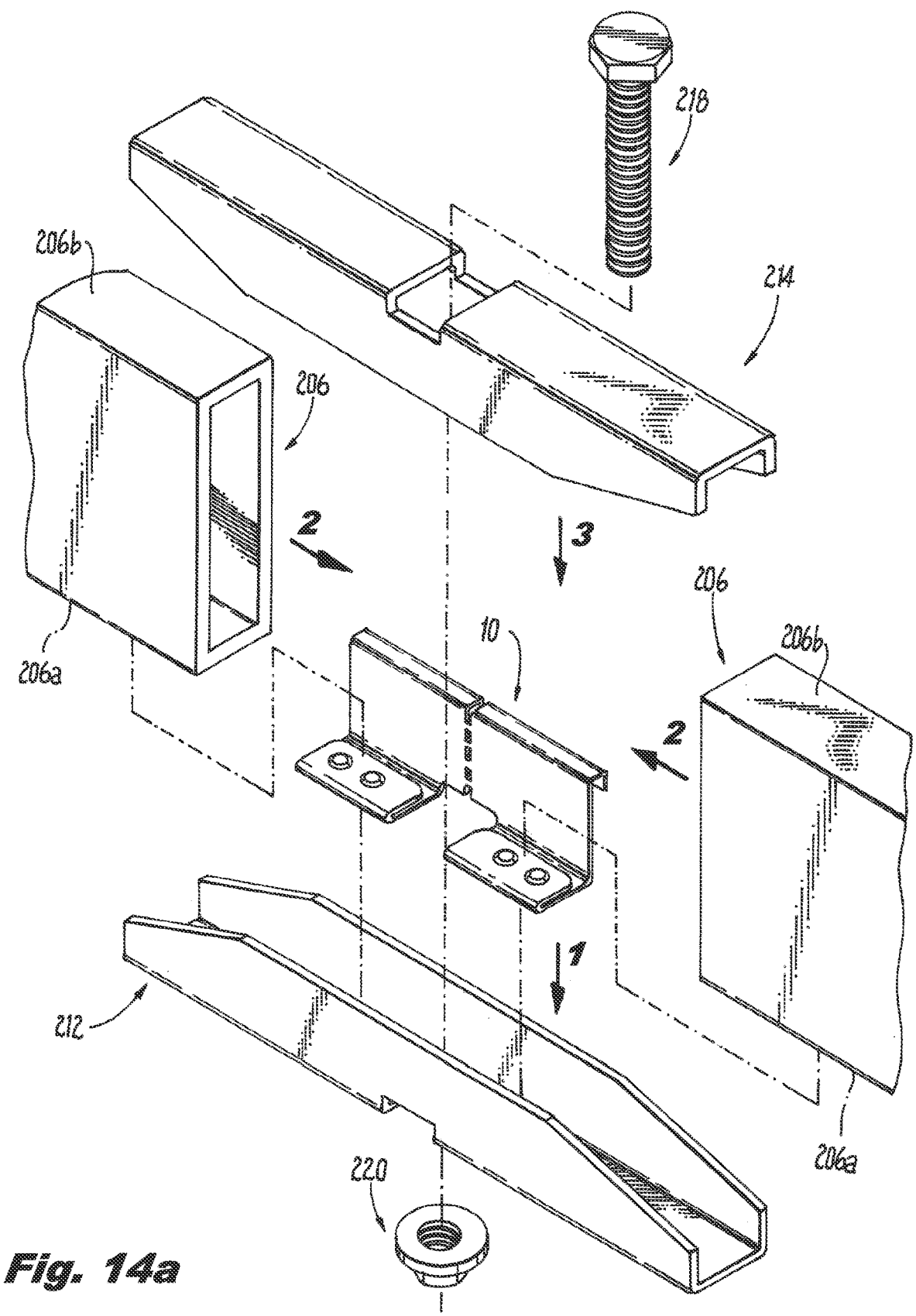
FIG. 14a is an exploded side perspective view of the butt splice assembly joining the rails of FIG. 13, illustrating an exemplary sequence of the installation of the bonding clip of FIG. 1 into a first splice bracket of the butt splice assembly, the rail positioned for insertion within the first splice bracket, and a second splice bracket of the butt splice assembly positioned for insertion onto the rails.
Figure 14B:
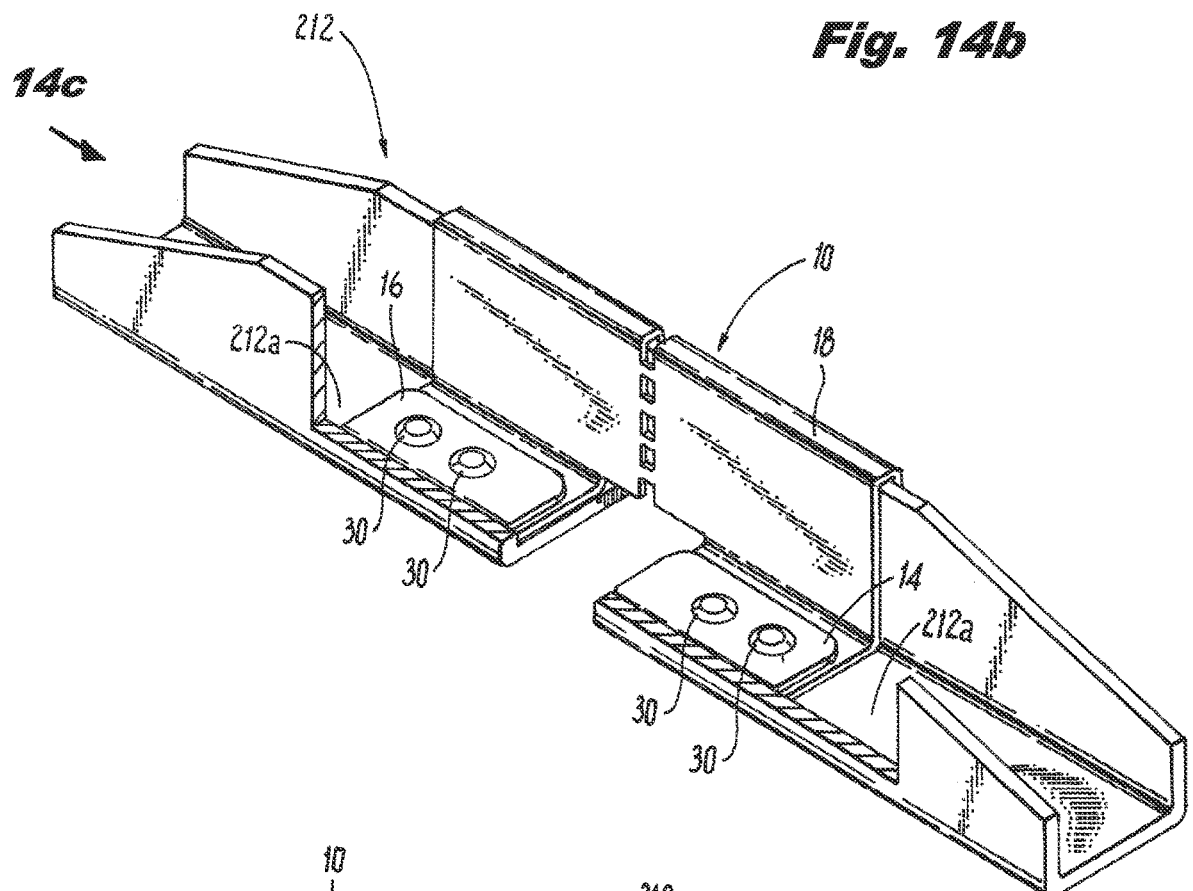
FIG. 14b is a side perspective view of the first splice bracket of FIG. 14a in partial cut-away illustrating the bonding clip inserted within the first splice bracket.

The first leg 14 extends from the first side edge 13a of the side wall 13 of the body 12 adjacent the first end edge 13c. Preferably, the first leg 14 extends from the first side edge 13a of the side wall 13 at a 90 degree angle so that the first leg 14 is perpendicular to the side wall 13. However, the first leg 14 may extend from the first side edge 13a of the side wall 13 at any angle that matches the configuration of the metal structure to which the bonding clip 10 is to be attached. In the exemplary embodiment shown, the first leg 14 is formed by folding a portion of the first leg 14 back onto itself similar to that shown in FIGS. 9a-9d. The first leg 14 has a length "L2" that may be configured and dimensioned to fit within a splice bracket 212 or 214, as shown in FIG. 13. For example, the length "L2" of the first leg 14 can range from about 0.25 inches to about 1.5 inches. The first leg 14 has a width "W1" that may be configured and dimensioned to fit within a splice bracket 212 or 214, as shown in FIGS. 13 and 14a. For example, the width "W1" of the first leg 14 can range from about 0.25 inches to about 0.5 inches.

Figure 7:
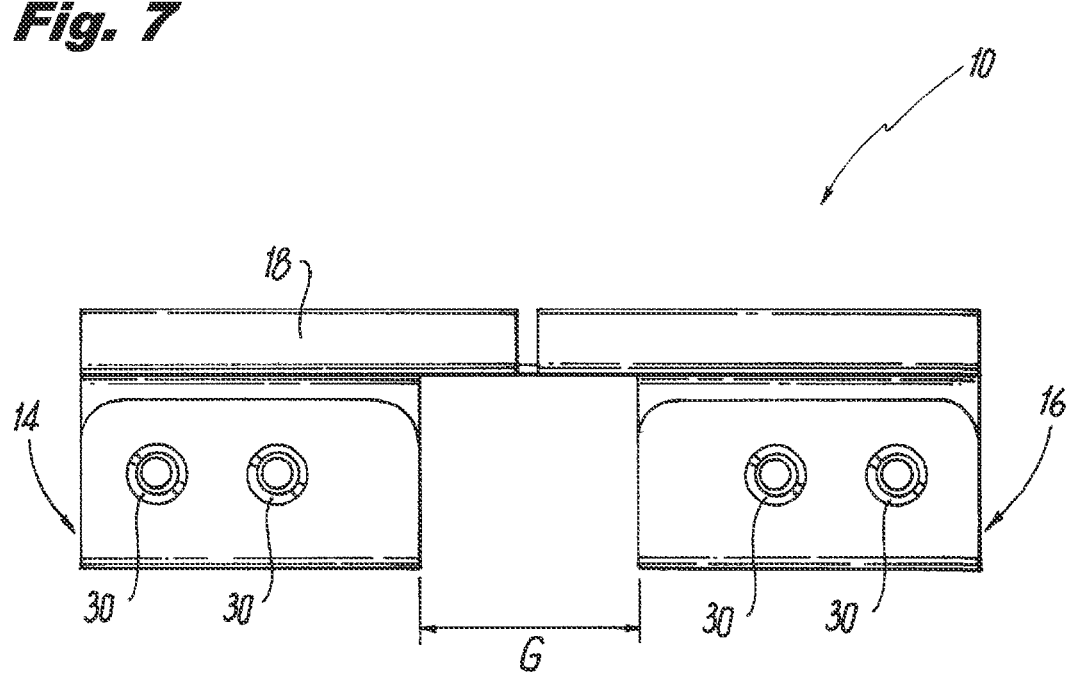
FIG. 7 is a top plan view of the bonding clip of FIG. 2.
Figure 8:
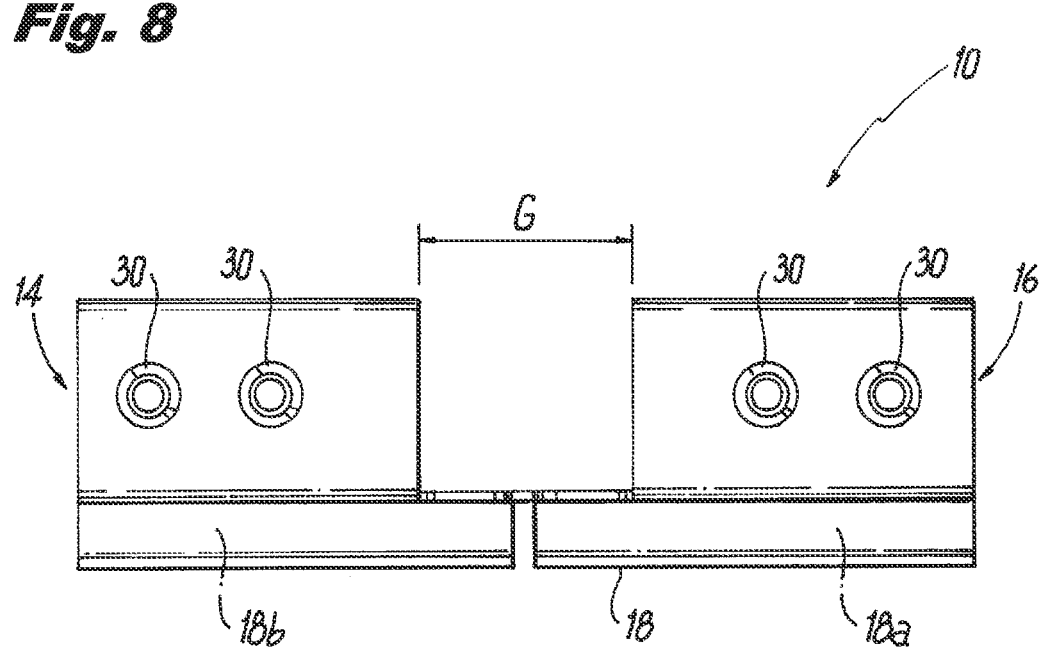
FIG. 8 is a bottom plan view of the bonding clip of FIG. 2.

The second leg 16 extends from the first side edge 13a of the side wall 13 of the body 12 adjacent the second end edge 13d. Preferably, the second leg 16 extends from the first side edge 13a of the side wall 13 at a 90 degree angle so that the second leg 16 is perpendicular to the body 12. However, the second leg 16 may extend from the first side edge 13a of the side wall 13 at any angle that matches the configuration of the metal structure to which the bonding clip 10 is to be attached. Preferably, the second leg 16 extends from the side wall 13 in the same direction as the first leg 14. In another embodiment, the second leg 16 may extend from the side wall 13 in other directions, such as in a direction that is opposite to the first leg 14. In the exemplary embodiment shown, the second leg 16 is formed by folding a portion of the second leg 16 back onto itself as shown in FIGS. 9a-9d. The second leg 16 has a length "L3" that may be configured and dimensioned to fit within a splice bracket 212 or 214, as shown in FIGS. 13 and 14a. For example, the length "L3" of the second leg 16 can range from about 0.25 inches to about 1.5 inches. The second leg 16 has a width "W2" that may be configured and dimensioned to fit within a splice bracket 212 or 214, as shown in FIGS. 13 and 14a. For example, the width "W2" of the second leg 16 can range from about 0.25 inches to about 0.5 inches. The length "L2" of the first leg 14 may be the same as the length "L3" of the second leg 16, or the length "L2" of the first leg 14 may be greater than or less than the length "L3" of the second leg 16. Similarly, the width "W1" of the first leg 14 may be the same as the width "W2" of the second leg 16, or the width "W1" of the first leg 14 may be greater than or less than the width "W2" of the second leg 16. In the exemplary embodiment shown, the first leg 14 is separated from the second leg 16 to form a gap "G," seen in FIGS. 7 and 8, between the legs 14 and 16. The gap "G" permits fasteners securing the splice brackets 212 or 214 to the rails 204 or 206 of cable tray assemblies 202, seen in FIG. 12, to pass the legs 14 and 16 of the bonding clip 10.

Figure 9A:
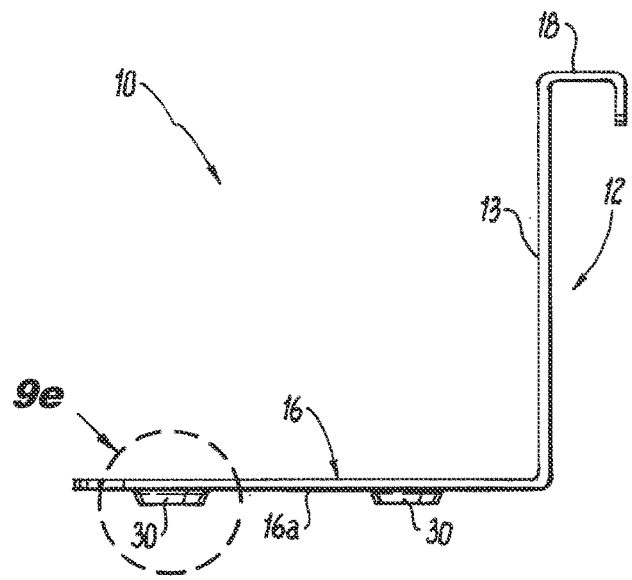
FIG. 9a is an end elevation view of the bonding clip of FIG. 2 prior to the legs of the bonding clip being folded.
Figure 9B:
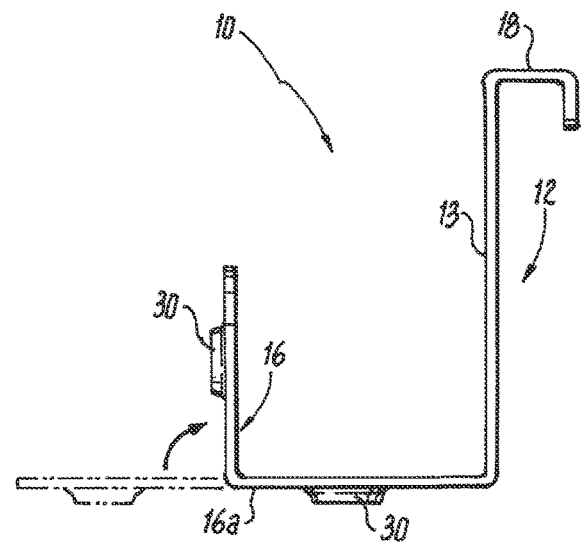
FIG. 9b is an end elevation view of the bonding clip of FIG. 9a illustrating the legs of the bonding clip being folded.
Figure 9C:
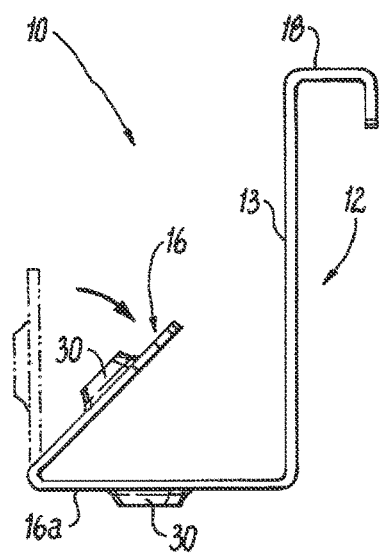
FIG. 9c is an end elevation view of the bonding clip of FIG. 9a illustrating the legs of the bonding clip being folded.
Figure 9D:
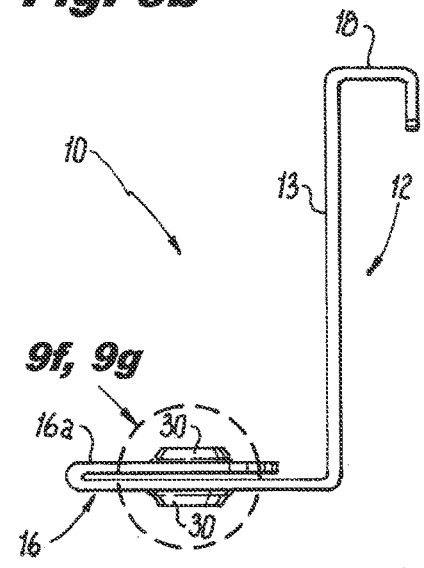
FIG. 9d is an end elevation view of the bonding clip of FIG. 2 with the legs of the bonding clip folded and illustrating one or more piercing members facing in a first direction relative to the leg of the bonding clip and one or more piercing members facing in a second direction relative to the leg of the bonding clip.
Figure 9E:
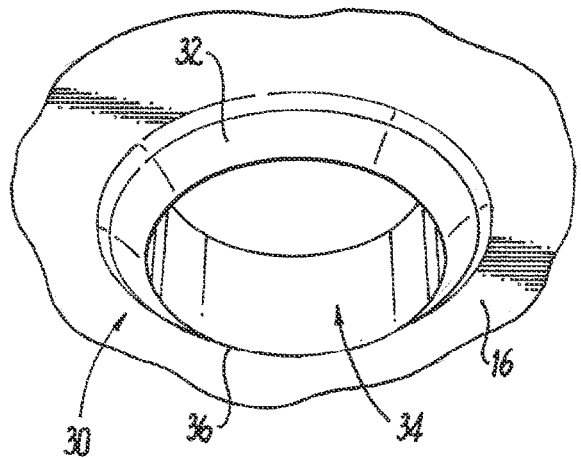
FIG. 9e is a perspective view of a portion of the bonding clip of FIG. 9a taken from detail 9e, illustrating an exemplary embodiment of a piercing member used to pierce a protective coating on a metal structure to establish an electrically conductive path between the bonding clip and the metal structure.
Figure 9F:
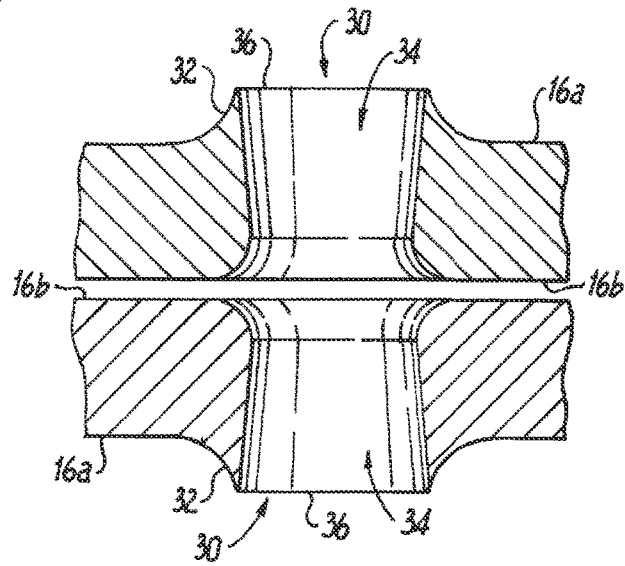
FIG. 9f is a partial cross-sectional view of a portion of the bonding clip of FIG. 9d taken from detail 9f, 9g, and illustrating the piercing members of FIG. 9e facing in the first direction and the second direction.
Figure 9G:
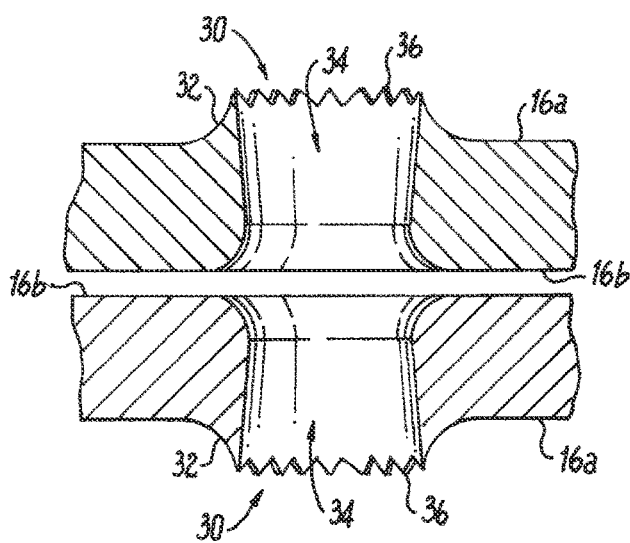
FIG. 9g is a partial cross-sectional view of a portion of the bonding clip of FIG. 9d taken from detail 9f, 9g, and illustrating another exemplary embodiment of a piercing member used to pierce protective coatings on a metal structure.

Turning now to FIGS. 9e, 9f and 9g, each leg 14 and 16 of the bonding clip 10 also has one or more piercing members 30 extending from the leg 14 and/or leg 16. The piercing members 30 are provided to cut through or pierce the protective coating on the metal structure 200, seen in FIG. 11, or structures that the bonding clip 10 is to be attached. The piercing members 30 are teeth-like projections that can penetrate the protective coatings on the metal structure 200 to contact the metal underneath the protective coating in order to create an electrically conductive path between the piercing member 30 and the metal structure 200. For example, each piercing member 30 may be a raised surface 32 extending from a bottom surface 14a and/or 16a of the respective leg 14 and/or 16. The raised surface 32 has a central opening 34 forming a rim 36 with a sharp edge or with sharp edges that enable the piercing member 30 to cut through or pierce the protective coating on the metal structure 200. It is noted that the raised surface 32, central opening 34 and rim 36 are sometimes called in the industry a "volcano." Each piercing member 30 can be a unitary circular or other shaped tooth or structure, seen for example in FIGS. 9e and 9f, that is capable of cutting through or piercing the protective coating on the metal structure 200. In another exemplary embodiment, each piercing member 30 can be a unitary circular or other shaped tooth or structure having a serrated rim 36, seen in FIG. 9g, that is also capable of cutting through or piercing the protective coating on the metal structure 200. The piercing members 30 can be extruded from the legs 14 and 16, or the piercing members 30 can be secured to the legs 14 and 16 by for example a welded joint. While the embodiments shown have a plurality of piercing members 30 extending from the surfaces of the legs 14 and 16, there may be a single piercing member 30 extending from the surfaces of the legs 14 and 16.

Figure 3:
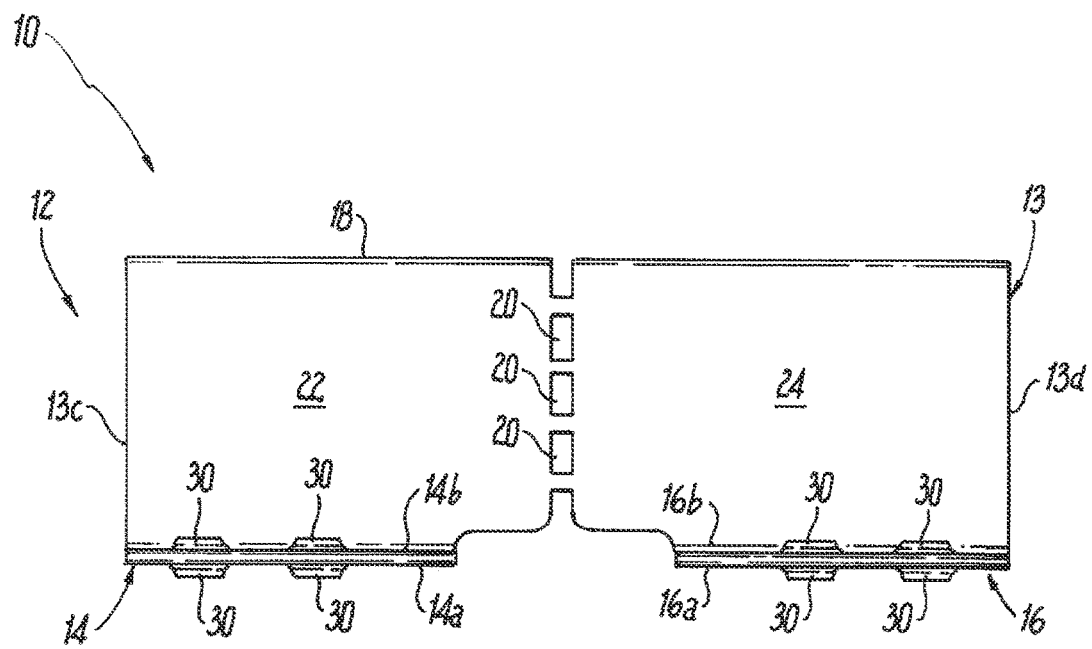
FIG. 3 is a side elevation view of the bonding clip of FIG. 2, illustrating perforations for separating the bonding clip into a first clip section and a second clip section.
Figure 4:
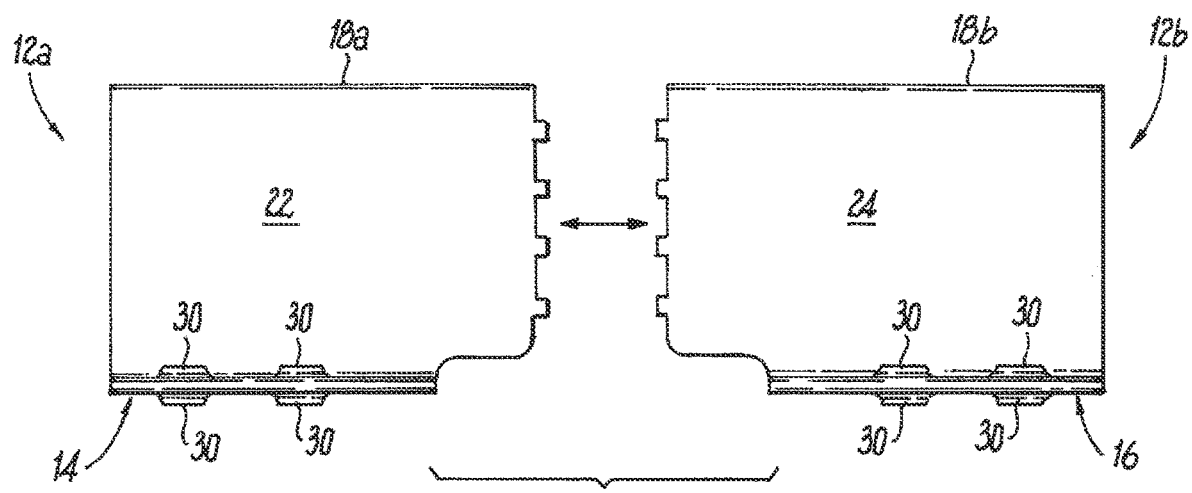
FIG. 4 is a side elevation view of the bonding clip of FIG. 3 with the perforations broken so that the first clip section is separated from the second clip section.
Figure 5:
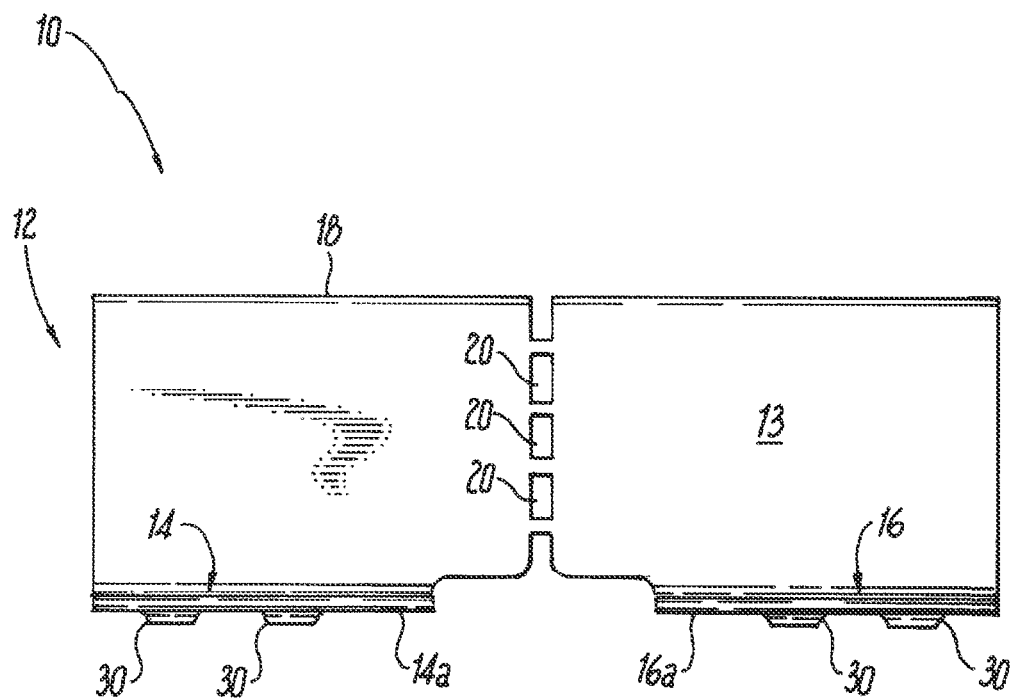
FIG. 5 is a side elevation view of another exemplary embodiment of a bonding clip according to the present disclosure, illustrating piercing members extending from a bottom surface of legs of the bonding clip.
Figure 6:
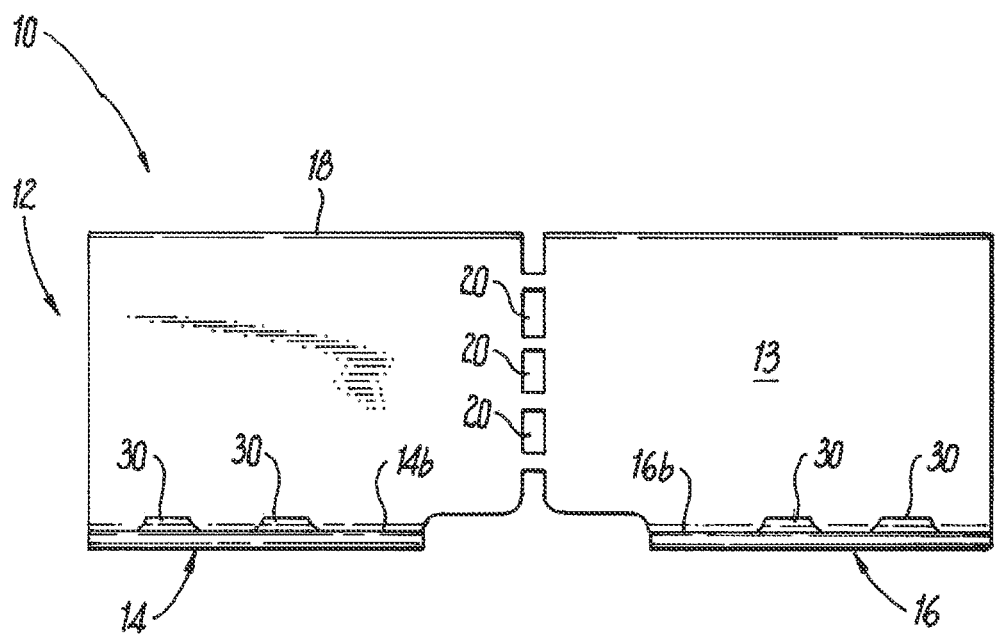
FIG. 6 is a side elevation view of another exemplary embodiment of a bonding clip according to the present disclosure, illustrating piercing members extending from a top surface of the legs of the bonding clip.

In the exemplary embodiment of FIG. 3, the first and second legs 14 and 16 are formed by folding a portion of the leg back onto itself as shown in FIGS. 9a-9d. In the end elevation view of FIGS. 9a-9d, the leg shown is leg 16. By folding the leg 16 back onto itself, the rim 36 of the one or more piercing members 30 may extend in a first direction, e.g., in a direction toward the second (or top) side edge 13b of the side wall 13 of the body 12, and the rim 36 of the one or more piercing members 30 may extend in a second direction, e.g., in a direction away from the first (or bottom) side edge 13a of the side wall 13 of the body 12, as seen in FIG. 9d. In the exemplary embodiment of FIG. 5, the leg 14 or 16 may not be folded back upon itself such that one or more piercing members 30 extend from the bottom surface 14a of the first leg 14 and one or more piercing members 30 extend from the bottom surface 16a of the second leg 16. In the exemplary embodiment of FIG. 6, the leg 14 or 16 may not be folded back upon itself such that one or more piercing members 30 extend from the top surface 14b of the first leg 14 and one or more piercing members 30 extend from the top surface 16b of the second leg 16.

Figure 10:
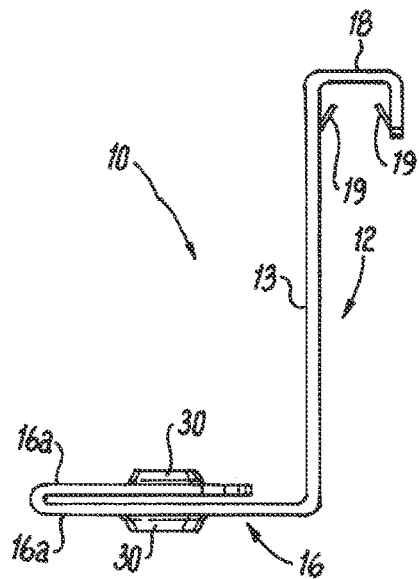
FIG. 10 is an end elevation view of another exemplary embodiment of the bonding clip according to the present disclosure, illustrating the legs of the bonding clip folded with one or more piercing members facing in the first direction relative to the leg of the bonding clip, one or more piercing members facing in the second direction relative to the leg of the bonding clip, and one or more holding members used to hold the bonding clip in position when installed.
Figure 11:
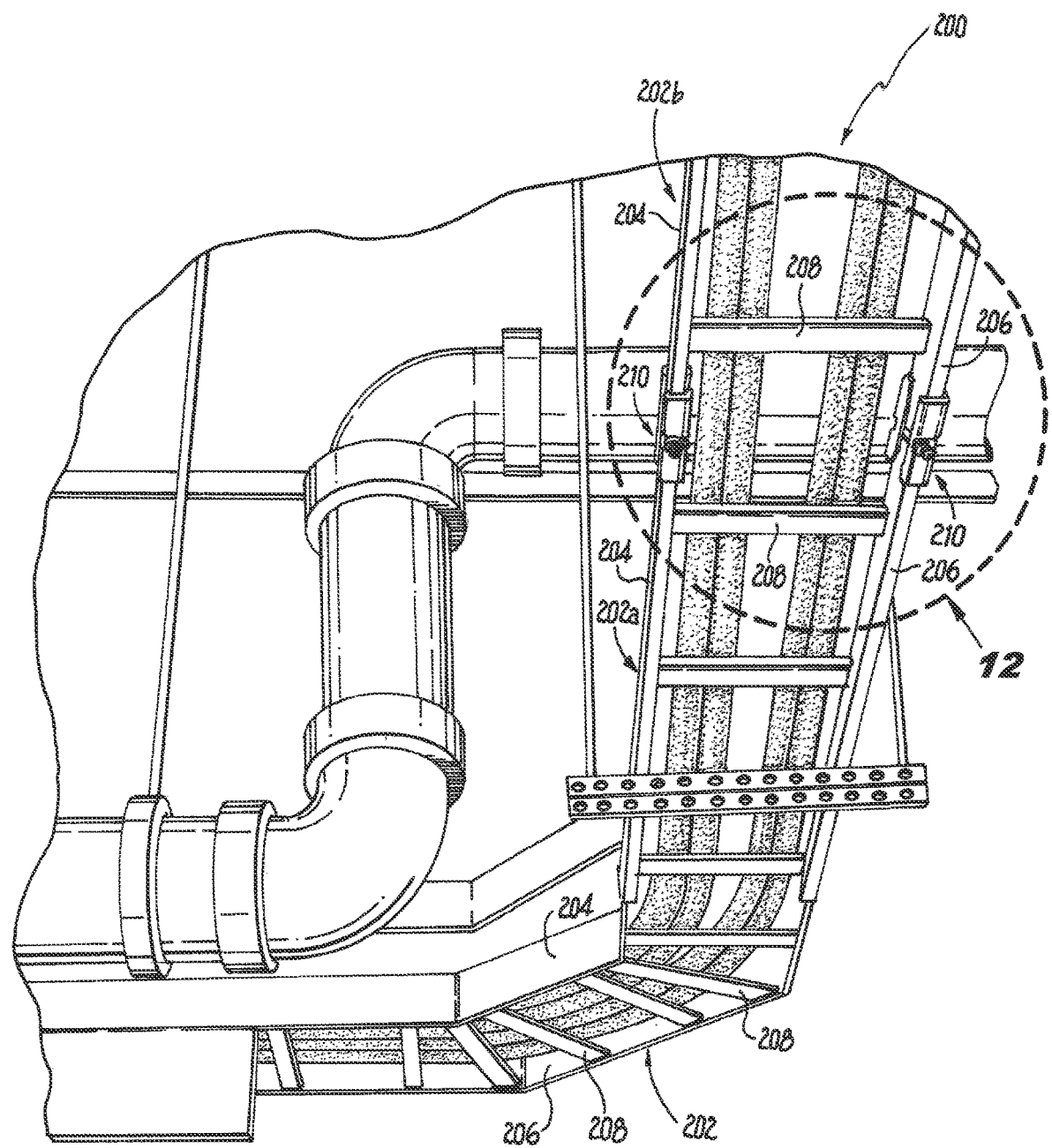
FIG. 11 is a perspective view of a portion of a cable management system installed in a datacenter with one or more cable tray assemblies joined together with a plurality of splice assemblies and bonded using the bonding clip of FIG. 2.
Figure 12:
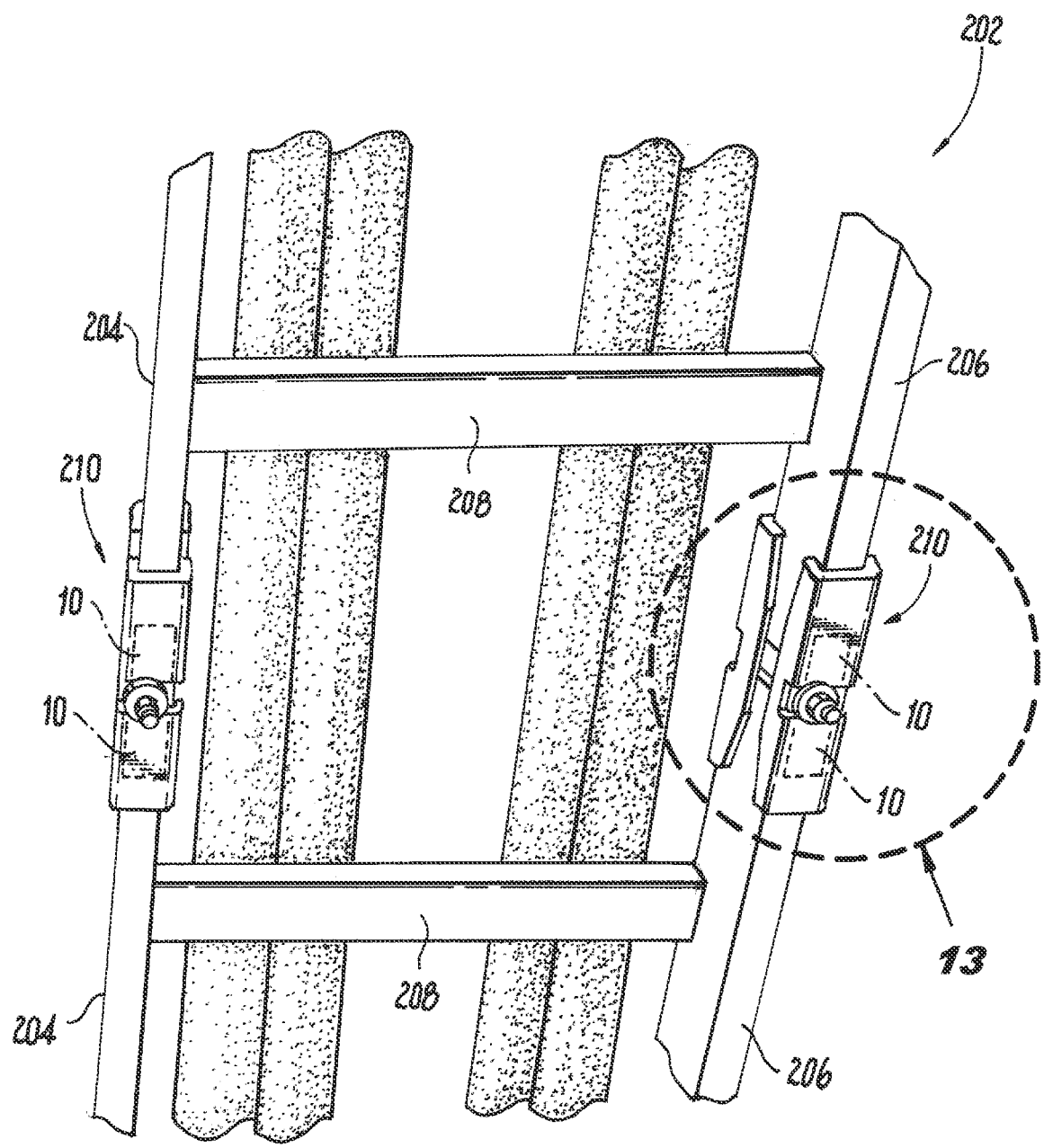
FIG. 12 is bottom plan view of a portion of two metal cable tray assemblies joined together with two splice assemblies and bonded using the bonding clip of FIG. 2.
Figure 16:
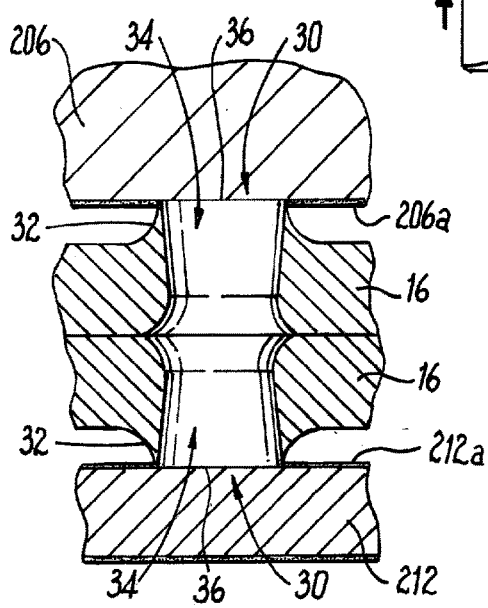
FIG. 16 is a cross-sectional view of a portion of a rail and splice bracket of FIG. 15 taken from line 16-16, illustrating piercing members cutting through a protective coating on the rail and the splice bracket.

Referring to FIGS. 2 and 9d, the mounting member 18 is provided to couple the bonding clip 10 to the splice bracket, e.g., splice brackets 212 or 214, of a cable tray assembly, e.g., cable tray assemblies 202a or 202b seen in FIG. 11. In the exemplary embodiment shown in FIGS. 2 and 9d, the mounting member 18 extends from the second side edge 13b of the side wall 13 of the body 12 and may be configured and dimensioned to fit over a side wall of a splice bracket 212 or 214 of a cable tray assembly 202. The mounting member 18 of FIGS. 2 and 9d is a J-shaped or U-shaped structure that can slide over a side wall of the splice bracket, e.g., splice bracket 212, as seen in FIG. 16. However, the mounting member 18 may be configured and dimensioned into other structures capable of coupling the bonding clip 10 to the splice bracket 212. In another embodiment shown in FIG. 10, the mounting member 18 may also include one or more gripping members 19 that can grip the side wall of the splice bracket, e.g., splice bracket 212, to at least temporarily hold the bonding clip 10 in position relative to the splice bracket 212.

Turning now to FIGS. 11-16, the installation of the bonding clip 10 to a metal structure 200 is shown. In this exemplary embodiment, the metal structure 200 is a cable management system where two cable tray assemblies 202 (distinguished as 202a and 202b) are joined together using one or more splice assemblies 210. In this exemplary embodiment, the cable tray assemblies 202, 202a and 202b are ladder rack type cable tray assemblies. Each cable tray assembly 202 includes a pair of parallel rails 204 and 206, and one or more cross braces 208 extending between the rails 204 and 206. When joining the cable tray assemblies 202, the rails 204 and 206 of each cable tray assembly 202 are joined together. More specifically, the rail 204 of one cable tray assembly 202 is joined to the rail 204 of another cable tray assembly 202, and the rail 206 of one cable tray assembly 202 is joined to the rail 206 of another cable tray assembly 202. A butt splice assembly 210, seen in FIG. 13, is used to join the rails 204 and 206 together. In one exemplary embodiment, the butt splice assembly 210 includes a first splice bracket 212, a second splice bracket 214 and a fastener assembly 216 extending between the first splice bracket 212 and the second splice bracket 214.

Figure 14C:
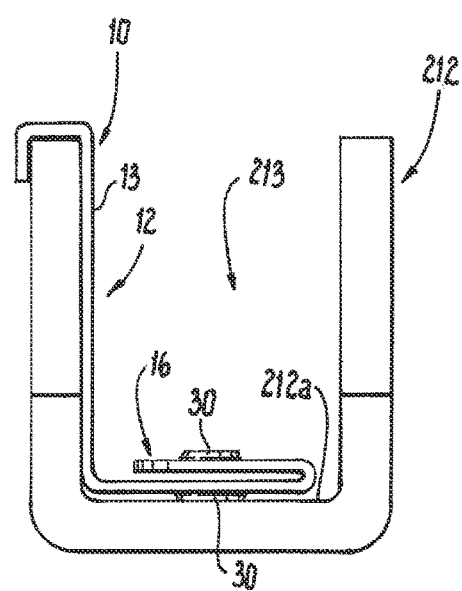
FIG. 14c is an end elevation view of the portion of the first splice bracket and bonding clip of FIG. 14b.
Figure 15:
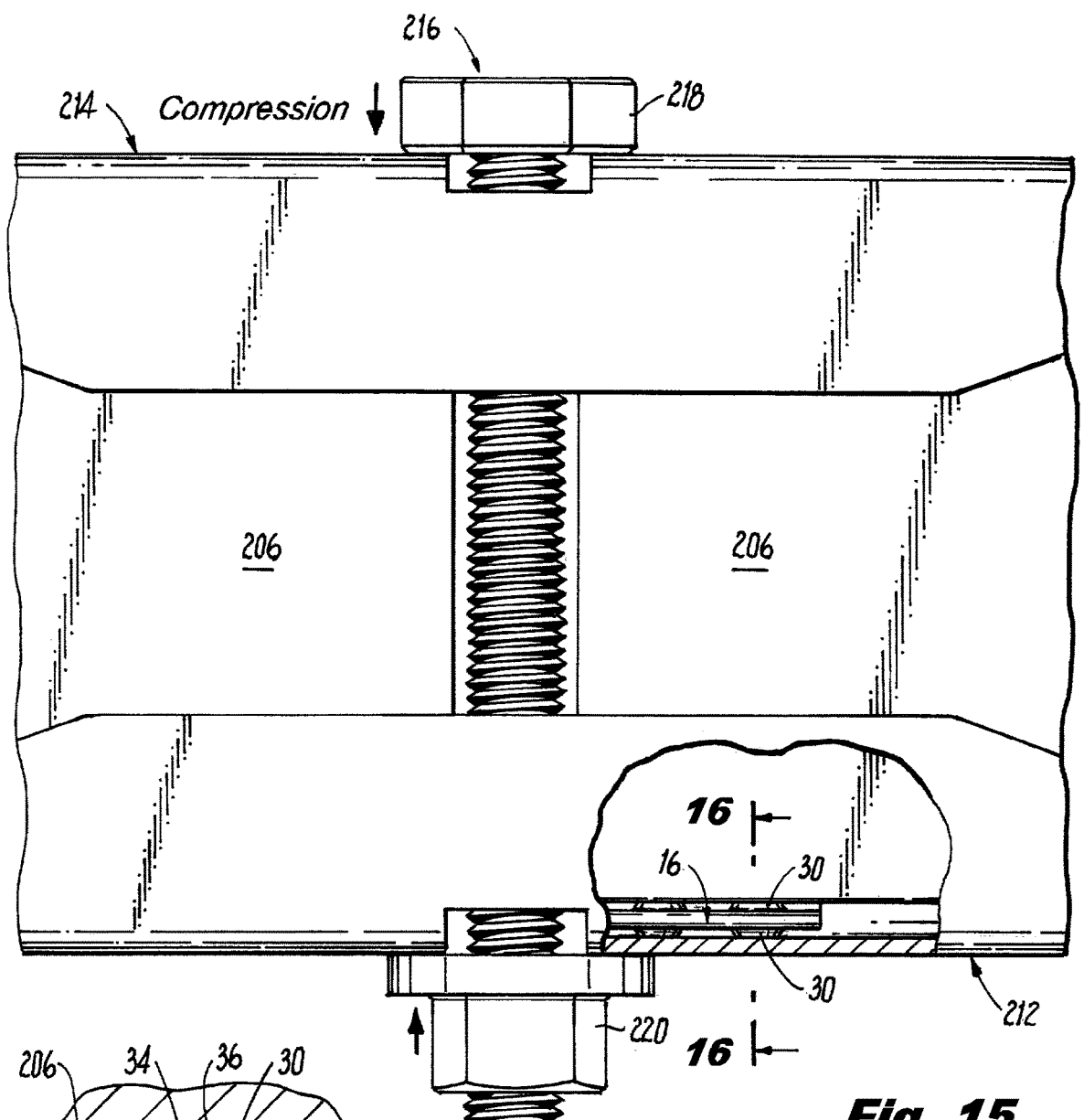
FIG. 15 is an enlarged side elevation view of the butt splice assembly joining rails of the cable tray assemblies of FIG. 13 in partial cut-away, illustrating the bonding clip is inserted between the first splice bracket and the rail.

Continuing to refer to FIGS. 13-16, to join the rail 206 of cable tray assembly 202a to the rail 206 of cable tray assembly 202b, the bonding clip 10 is first inserted into a channel 213, seen in FIG. 14c, in the first splice bracket 212 so that the piercing members 30 of the legs 14 and 16 of the bonding clip 10 extending in the first direction contact a bottom surface 212a of the first splice bracket 212, step 1 in FIG. 14a. The ends of the rails 206 are then positioned within the channel 213 of the first splice bracket 212 so that a bottom surface 206a of the rails 206 contact the piercing members 30 extending from the legs 14 and 16 facing the second direction, step 2 in FIG. 14a. A channel in the second splice bracket 214 (which is similar to channel 212a) is positioned on a top side 206b of each end of the rails 206, step 3 in FIG. 14a. In this exemplary embodiment, the fastener assembly 216 includes a bolt 218 and a nut 220, where the bolt 218 is passed through an aperture in the first splice bracket 212 past the ends of the rails 206 and through an aperture in the second splice bracket 214. The nut 220 is then threaded onto the bolt 218 and tightened. As the nut 220 is tightened, the piercing members 30 in contact with the protective coating on bottom surface 212a of the first splice bracket 212 and the rails 206 cuts through or pierces the protective coatings until the piercing members 30 contact the bare metal beneath the protective coatings, as seen in FIGS. 15 and 16, to form an electrically conductive path between the rails 206 and the first splice bracket 212.

When one end of at least one rail 204 or 206 in the cable management system 200 is properly connected to earth ground, the electrically conductive path between the rails 206 and the first splice bracket 212 facilitate bonding the cable management system 200. It is noted that the same installation process is followed for installing a bonding clip 10 into the butt splice assembly 210 joining the ends of the rails 204. It is also noted that the present disclosure also contemplates that a bonding clip 10 may be installed within the second splice bracket 214 in a similar manner as described above for installing the bonding clip 10 within the first splice bracket 212.

Turning now to FIGS. 17-19, 20a and 20b, another exemplary embodiment of a bonding clip according to the present disclosure is shown. In this exemplary embodiment, the bonding clip 50 may be of unitary construction that includes a body 52 having a first leg 54, a second leg 56, a first mounting member 58 and a second mounting member 60. In this exemplary embodiment the body 52 is a U-shaped structure having a first side wall 62 and a second side wall 64. It is noted that the bonding clip 50 may also be made of separate components joined together with for example, welded joints, mechanical fasteners and/or adhesives.

The first side wall 62 of the body 52 has a first (or bottom) side edge 62a, a second (or top) side edge 62b, a first end edge 62c and a second end edge 62d. The second side wall 64 of the body 52 has a first (or bottom) side edge 64a, a second (or top) side edge 64b, a first end edge 66c and a second end edge 64d. The body 52 has a length "L1" that may be configured and dimensioned to fit within a splice bracket, e.g., splice bracket 212 or 214, seen in FIGS. 13 and 14a, used to join metal rails, e.g., rails 204 or 206 seen in FIGS. 11 and 12, of cable tray assemblies 202. For example, the length "L1" of the body 52 can range from about 1 inch to about 6 inches. The body 52 has a height "H1" that may be configured and dimensioned to fit within a splice bracket 212 or 214, seen in FIGS. 13 and 14a. For example, the height "H1" of the body 52 can range from about 0.25 inches to about 1 inch.

In this exemplary embodiment, the first leg 54 extends between the first side edge 62a of the first side wall 62 and the first side edge 64a of the second side wall 64. The first leg 54 is positioned adjacent the first end edges 62c and 64c. Preferably, the first leg 54 extends from the first side edge 62a of the first side wall 62 to the first side edge 64a of the second side wall 64 at a 90 degree angle so that the first leg 54 is perpendicular to side walls 62 and 64. However, the first leg 14 may extend from the first side edge 62a of the side wall 62 to the first side edge 64a of the second side wall 64 at any angle that matches the configuration of the metal structure 200 to which the bonding clip 50 is to be attached. The first leg 54 has a length "L2" that may be configured and dimensioned to fit within a splice bracket 212 or 214, as shown in FIGS. 13 and 14a. For example, the length "L2" of the first leg 54 can range from about 0.25 inches to about 1.5 inches. The first leg 54 has a width "W1" that may be configured and dimensioned to fit within a splice bracket 212 or 214, as shown in FIGS. 13 and 14a. For example, the width "W1" of the first leg 54 can range from about 0.25 inches to about 0.5 inches.

The second leg 56 extends between the first side edge 62a of the first side wall 62 and the first side edge 64a of the second side wall 64. The second leg 56 is positioned adjacent the second end edges 62d and 64d. Preferably, the second leg 56 extends from the first side edge 62a of the first side wall 62 to the first side edge 64a of the second side wall 64 at a 90 degree angle so that the second leg 56 is perpendicular to the body 12. However, the second leg 56 may extend from the first side edge 62a of the side wall 62 to the first side edge 64a of the second side wall 64 at any angle that matches the configuration of the metal structure 200 to which the bonding clip 50 is to be attached. The second leg 56 has a length "L3" that may be configured and dimensioned to fit within a splice bracket 212 or 214, as shown in FIGS. 13 and 14a. For example, the length "L3" of the second leg 56 can range from about 0.25 inches to about 1.5 inches. The second leg 56 has a width "W2" that may be configured and dimensioned to fit within a splice bracket 212 or 214, as shown in FIGS. 13 and 14a. For example, the width "W2" of the second leg 56 can range from about 0.25 inches to about 0.5 inches. The length "L2" of the first leg 54 may be the same as the length "L3" of the second leg 56, or the length "L2" of the first leg 54 may be greater than or less than the length "L3" of the second leg 56. Similarly, the width "W1" of the first leg 54 may be the same as the width "W2" of the second leg 56, or the width "W1" of the first leg 54 may be greater than or less than the width "W2" of the second leg 56. In the exemplary embodiment shown, the first leg 54 is separated from the second leg 56 to form a gap "G" between the legs 54 and 56. The gap "G" permits fasteners securing the splice brackets 212 or 214 to the rails 204 and 206 of cable tray assemblies 202 to pass the legs 54 and 56 of the bonding clip 10.

Figure 17:
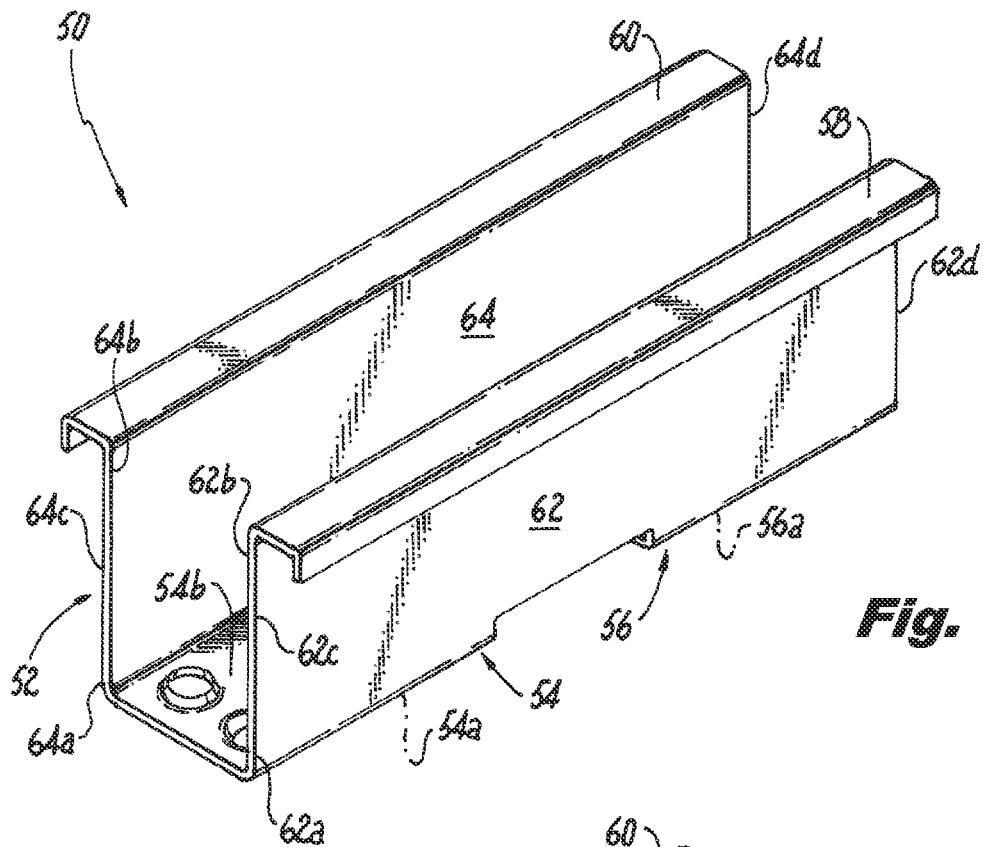
FIG. 17 is a perspective view of another exemplary embodiment of a bonding clip according to the present disclosure.
Figure 18:
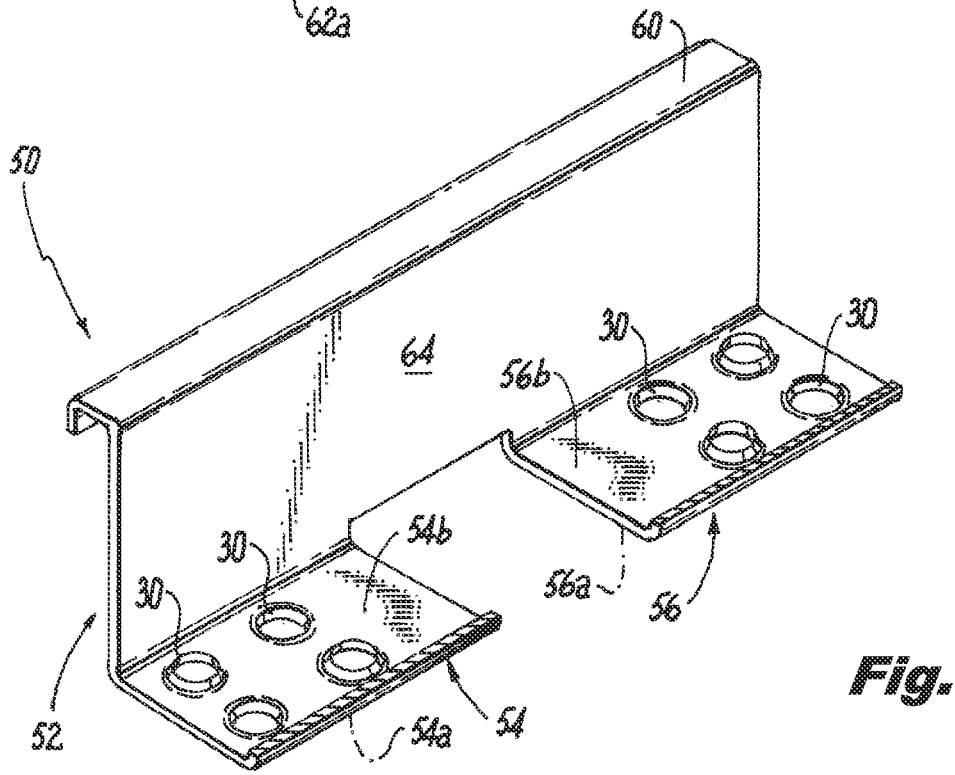
FIG. 18 is a perspective view of the bonding clip of FIG. 17, with a first side wall of the bonding clip cut away to reveal a plurality of piercing members of the bonding clip.

Continuing to refer to FIGS. 17-20, each leg 54 and 56 of the bonding clip 50 also has one or more piercing members 30 extending from the leg 54 and/or leg 56. The piercing members 30 are provided to cut through or pierce the protective coating on the metal structure or structures that the bonding clip 50 is to be attached. The piercing members 30 are teeth-like projections that can penetrate the protective coatings on the metal structure 200 to contact the metal underneath the protective coating in order to create an electrically conductive path between the piercing member 30 and the metal structure 200. For example, each piercing member 30 may be a raised surface 32 extending from a bottom surface 54a and/or 56a of the respective leg 54 and/or 56. The raised surface 32 has a central opening 34 forming a rim 36 with a sharp edge or with sharp edges that enable the piercing member 30 to cut through or pierce the protective coating on the metal structure 200. It is noted that the raised surface 32, central opening 34 and rim 36 are sometimes called in the industry a "volcano." Each piercing member 30 can be a unitary circular or other shaped tooth or structure, seen for example in FIGS. 9E and 9F, that is capable of cutting through or piercing the protective coating on the metal structure 200. In another exemplary embodiment, each piercing member 30 can be a unitary circular or other shaped tooth or structure having a serrated rim 36, seen in FIG. 9G, that is also capable of cutting through or piercing the protective coating on the metal structure. The piercing members 30 can be extruded from the legs 54 and 56, or the piercing members 30 can be secured to the legs 54 and 56 by for example a welded joint. While the embodiment shown has a plurality of piercing members 30 extending from the surfaces of the legs 54 and 56, there may be a single piercing member 30 extending from the surfaces of the legs 54 and 56. In the exemplary embodiment of FIGS. 17-20, one or more of the plurality of piercing members 30 extend in the first direction, and one or more of the plurality of piercing members 30 extend in the second direction, as seen in FIGS. 17 and 19. However, in other embodiments one or more of the piercing members 30 may extend from the bottom surface 54a of the first leg 54, and one or more of the piercing members 30 may extend from the bottom surface 56a of the second leg 56. In other embodiments, one or more piercing members 30 may extend from the top surface 54b of the first leg 54, and one or more piercing members 30 extend from the top surface 56b of the second leg 56.

Figure 22:
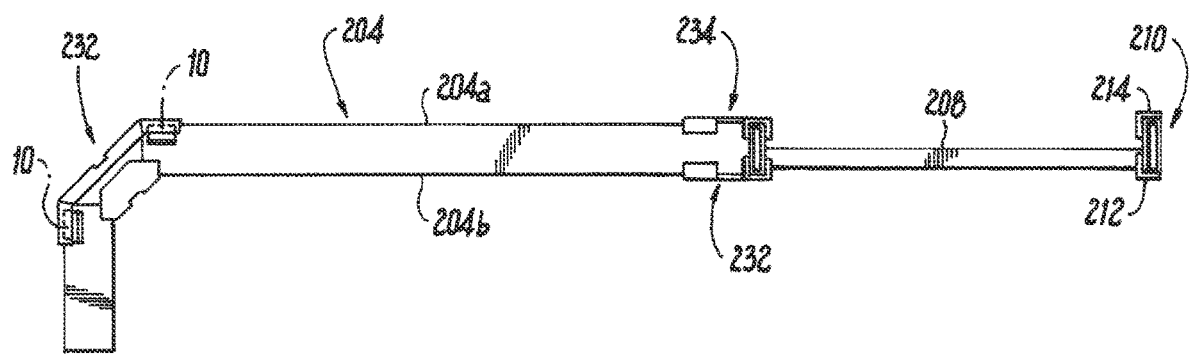
FIG. 22 is a side elevation view of the portion of the two metal cable tray assemblies of FIG. 21 taken from line 22-22.

The mounting members 58 and 60 are provided to couple the bonding clip 50 to the splice bracket, e.g., splice brackets 212 or 214, of a cable tray assembly, e.g., cable tray assemblies 202a or 202b seen in FIGS. 11 and 22. In the exemplary embodiment shown in FIGS. 17 and 20a, the mounting member 58 extends from the second side edge 62b of the side wall 62 and the mounting member 60 extends from the second side edge 64b of the side wall 64. The mounting members 58 and 60 may be configured and dimensioned to fit over a side wall of a splice bracket 212 or 214 of a cable tray assembly 202a or 202b. The mounting members 58 and 60 are J-shaped or U-shaped structures that can slide over a side wall of the splice bracket, e.g., splice bracket 212, as seen in FIG. 20a. However, the mounting member 58 and 60 may be configured and dimensioned into other structures capable of coupling the bonding clip 50 to the splice bracket 212 or 214. In another embodiment shown in FIG. 10, the mounting members 58 and 60 may also include one or more gripping members 70 and 72 respectively, seen in FIG. 20b, that can grip the side wall of the splice bracket, e.g., splice bracket 212, to at least temporarily hold the bonding clip 50 in position relative to the splice bracket 212.

Figure 21:
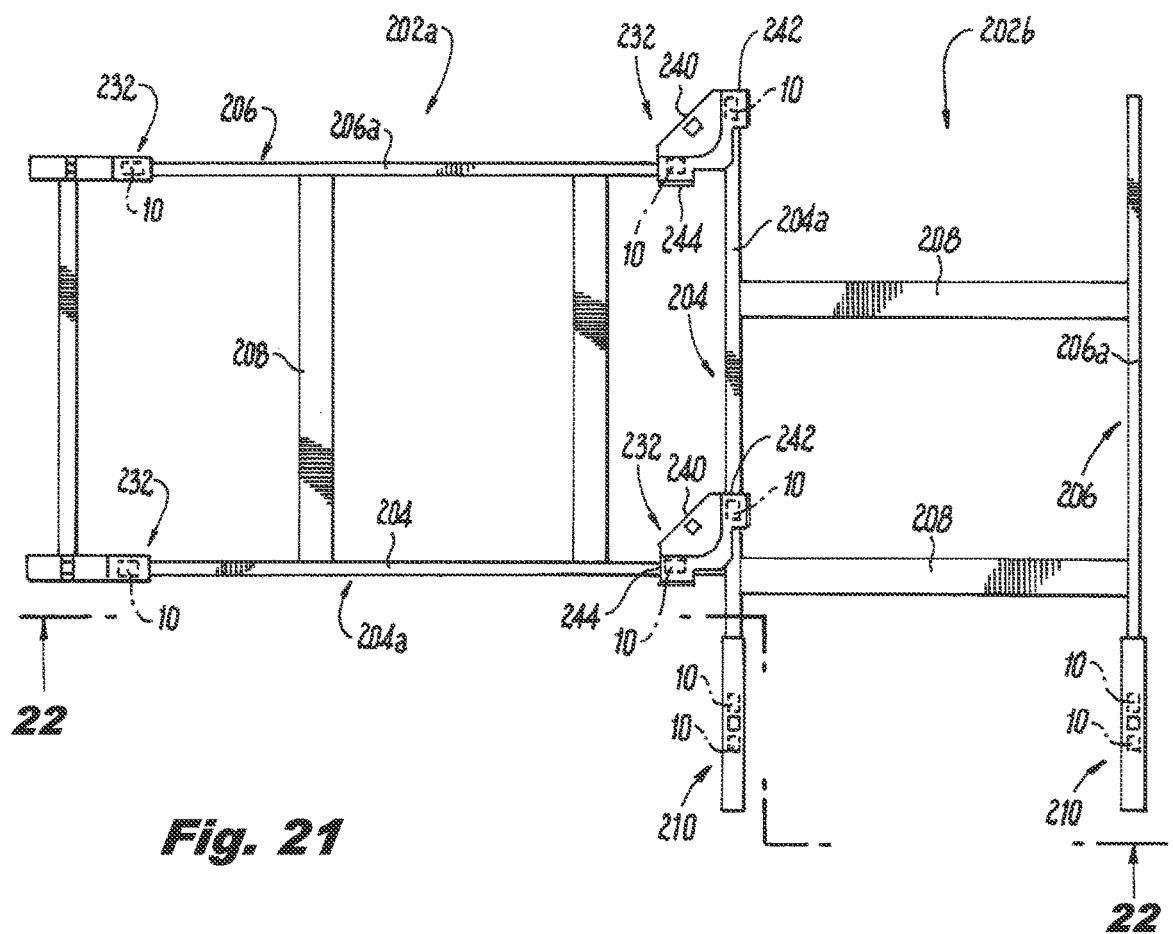
FIG. 21 is a bottom plan view of a portion of two metal cable tray assemblies joined together using a T-junction splice assembly and bonded using the first and second clip sections of FIG. 4.

Referring now to FIGS. 21-28, another exemplary embodiment of the use of the bonding clip 10 is shown. In this exemplary embodiment, the bonding clip 10 is split into the first clip section 22 and the second clip section 24, seen in FIG. 4. As described above, the first clip section 22 includes the body portion 12a, the first leg 14 and the mounting member portion 18a. The second clip section 24 includes the body portion 12b, the second leg 16 and the mounting member portion 18b. In this exemplary embodiment, a T-junction splice assembly 230 is used to join the rails 204 and 206 of two cable tray assemblies 202a or 202b together. T-junction splice assemblies 230 are used to join one cable tray assembly 202a perpendicular to another cable tray assembly 202b as seen in FIG. 21. In other words, the T-junction splice assembly 230 creates a 90 degree splice between cable tray assemblies 202a and 202b.

Figure 23:
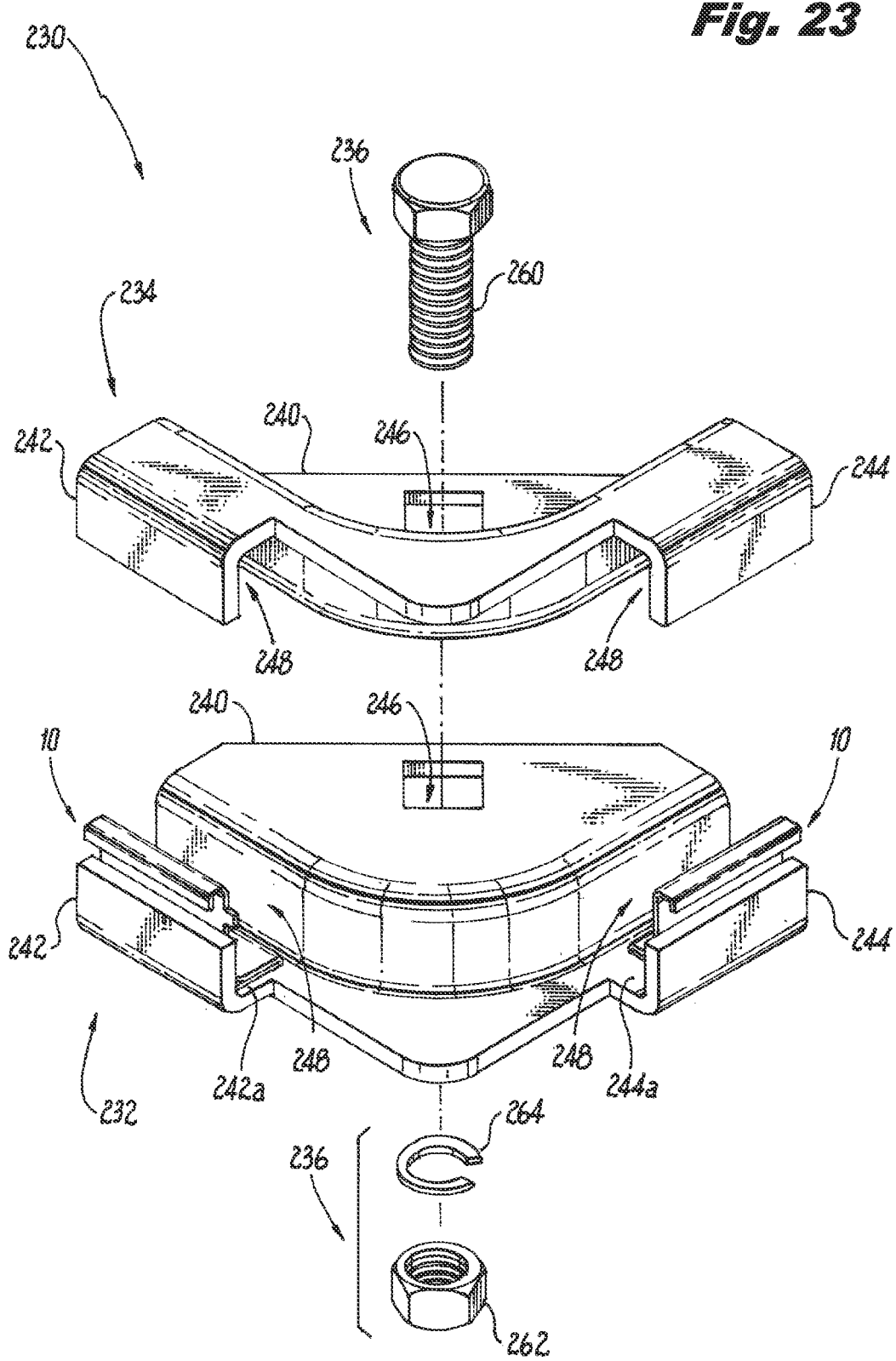
FIG. 23 is a perspective view of another exemplary embodiment of splice assembly and bonding clip according to the present disclosure.
Figure 24:
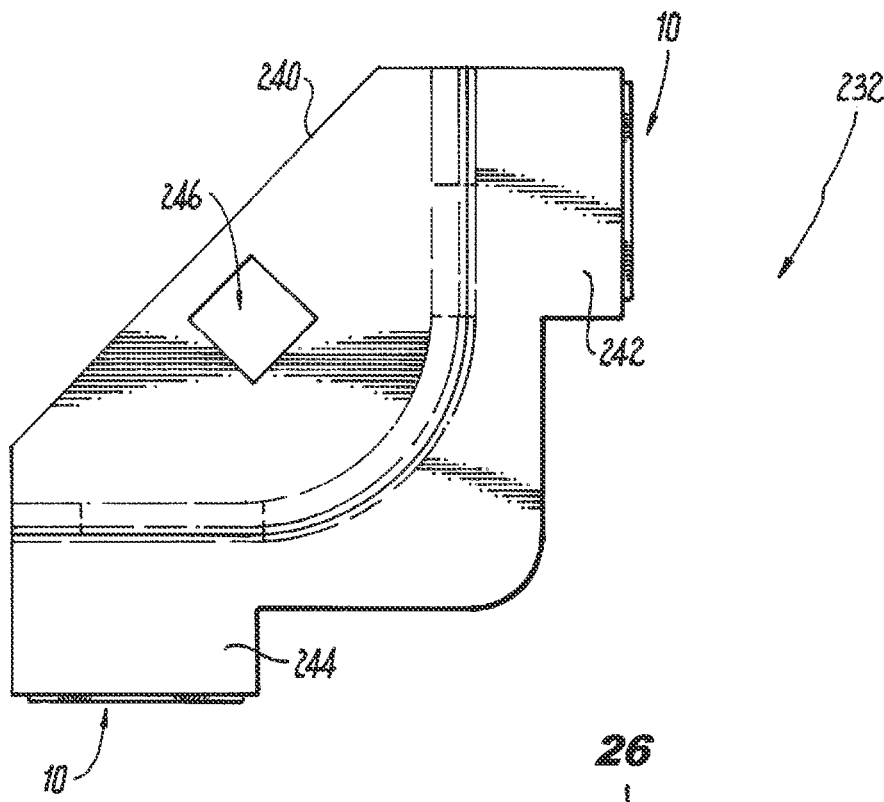
FIG. 24 is a bottom plan view of a first splice bracket of the splice assembly of FIG. 23.

Referring to FIG. 23, in one exemplary embodiment, the T-junction splice assembly 230 includes a first splice bracket 232, a second splice bracket 234 and a fastener assembly 236. The fastener assembly 236 extends between the first splice bracket 232 and the second splice bracket 234 and is used to secure the first splice bracket 232 and the second splice bracket 234 to the rails of the cable tray assemblies 202, as shown in FIGS. 21-23. T-junction splice assemblies 230 are know in the art and the splice brackets 232 and 234 are typically shaped to form a 90 degree junction. In the embodiment shown, the first splice bracket 232 and the second splice bracket 234 of the T-junction splice assemblies 230 are substantially the same. Each splice bracket 232 and 234 includes a main body 240 and a pair of rail guides 242 and 244. The main body 240 also includes an aperture 246 through which a portion of the fastener assembly 236 passes so that the first splice bracket 232, the second splice bracket 234 and rails 204 and/or 206 of the cable tray assemblies 202a and 202b can be attached together. Each guide rail 242 and 244 includes a channel 248 configured to receive a rail 204 or 206 of a cable tray assembly 202.

Figure 25:
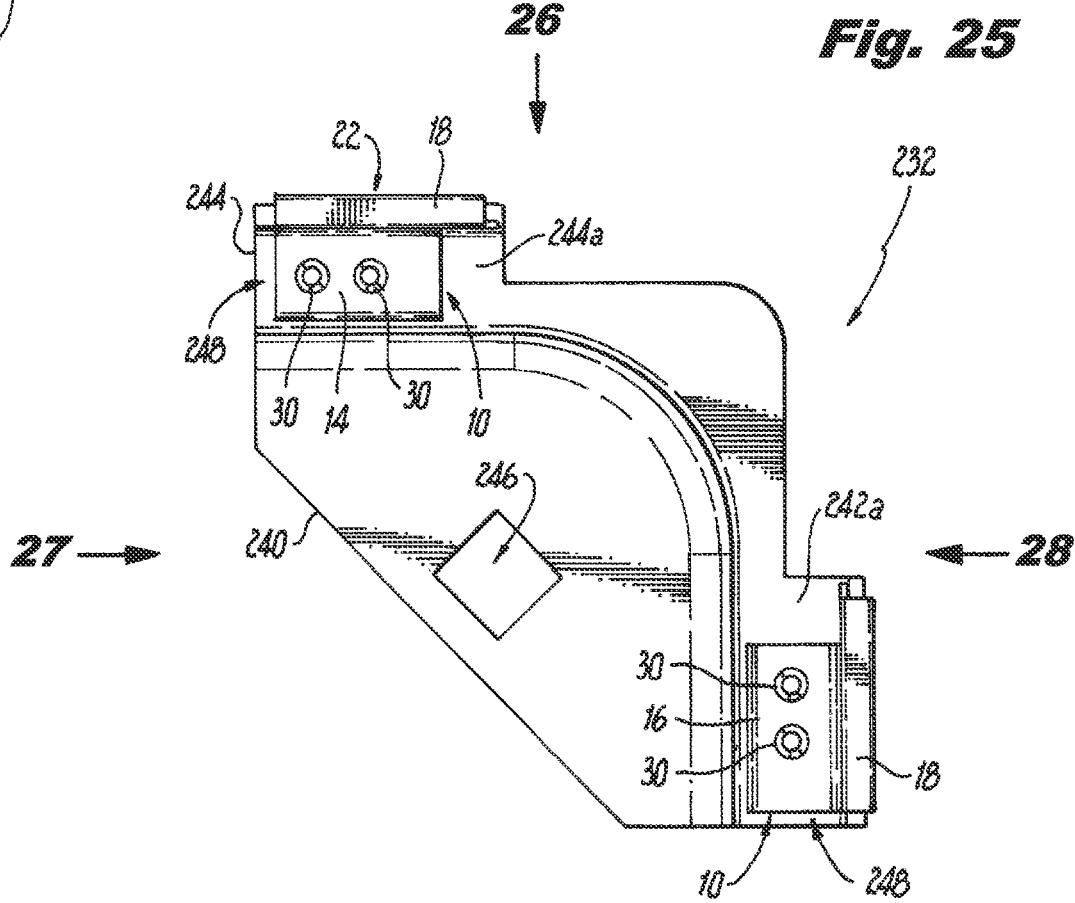
FIG. 25 is a top plan view of the first splice bracket of FIG. 24, illustrating bonding clips of FIG. 21 coupled to the first splice bracket.
Figure 26:
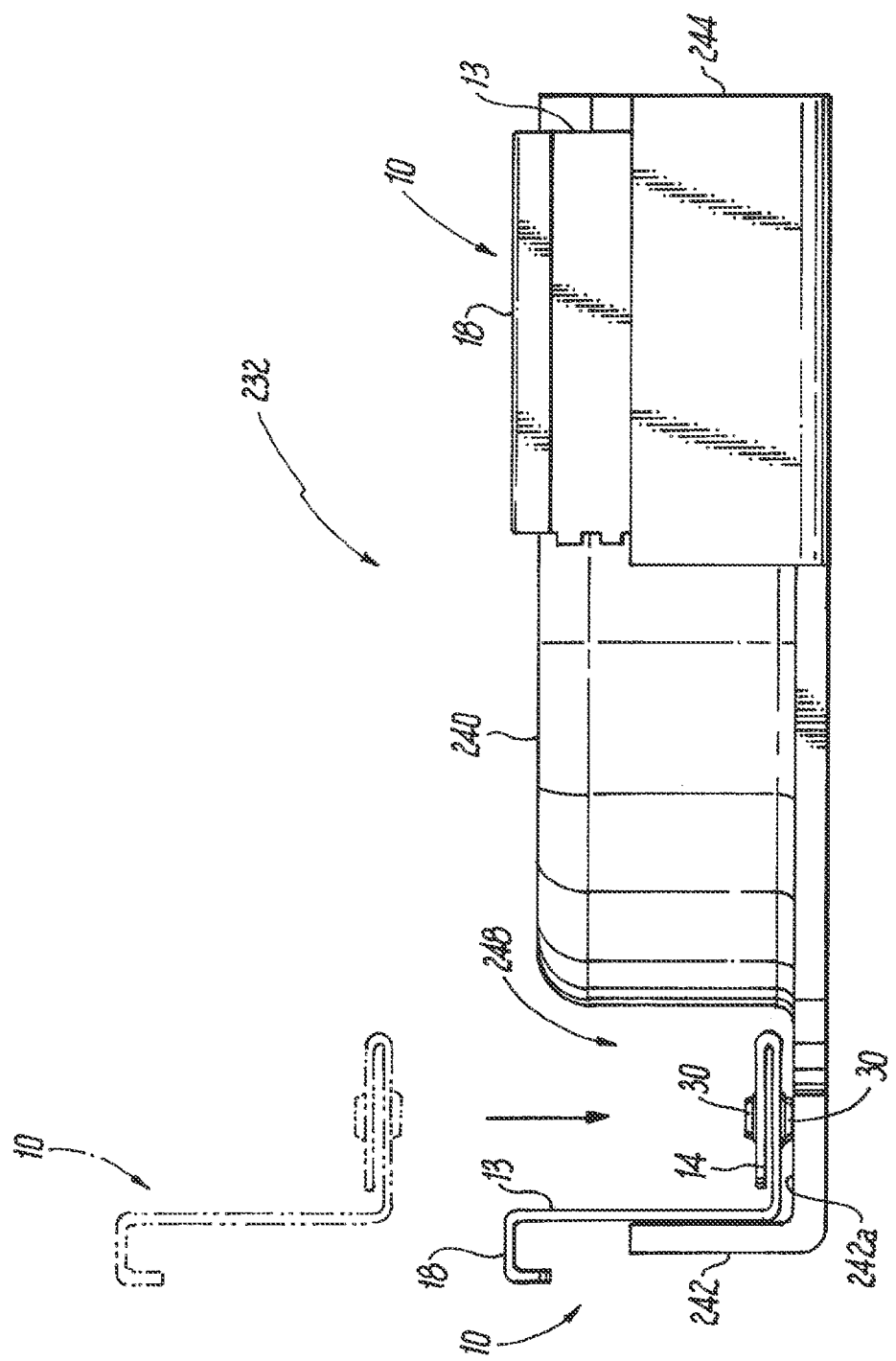
FIG. 26 is a side elevation view of the first splice bracket and clip section of FIG. 25 taken from line 26-26.
Figure 27:
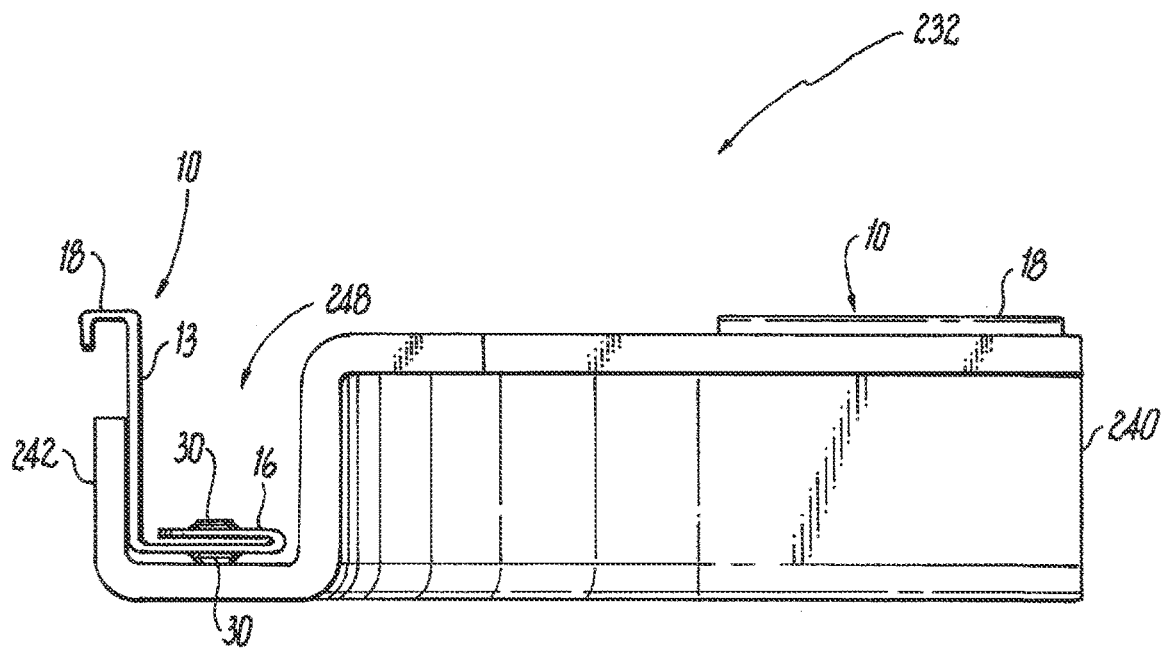
FIG. 27 is a side elevation view of the first splice bracket and clip section of FIG. 24 taken from line 27-27.
Figure 28:
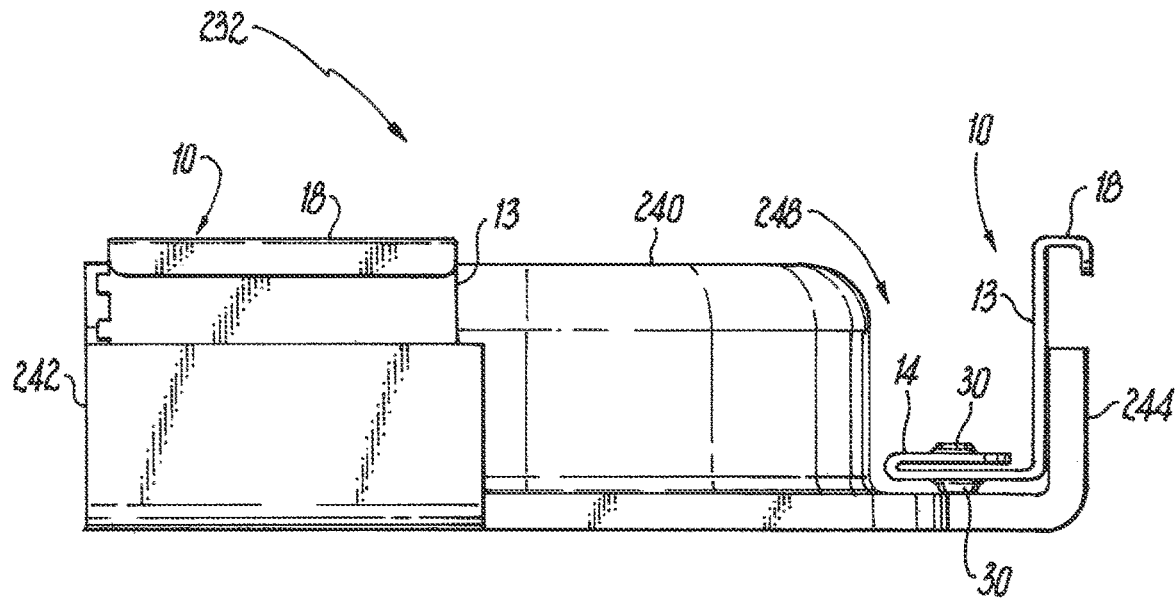
FIG. 28 is a side elevation view of the first splice bracket and bonding clip of FIG. 25 taken from line 28-28.

For ease of description, the attachment of the rails 204 and 206 of cable tray assembly 202a to the rail 204 of cable tray assembly 202b, as seen in FIG. 11, will be described with a bonding clip 10 installed in the first splice bracket 232. However, bonding clips 10 may be installed in the second splice bracket 234 instead of the first splice bracket 232 or bonding clips 10 may be installed in both the first and second splice brackets 232 and 234. As shown in FIGS. 25 and 26, to join the rail 204 of cable tray assembly 202a to the rail 204 of cable tray assembly 202b, a bonding clip 10 is first inserted into each channel 248 in the guide rails 242 and 244 of the first splice bracket 232 so that the piercing members 30 of the legs 14 and 16 extending in the first direction contact an inner surface 242a or 244a in the guide rails 242 and 244 respectively, as shown in FIGS. 19 and 22. As shown in FIGS. 21-23, the end of the rail 204 of cable tray assembly 202a is positioned within the channel 248 of the guide rail 244 of the first splice bracket 232 so that a bottom surface 204a of the rail 204 contacts the piercing members 30 extending from the leg 14 facing in the second direction. Similarly, the rail 204 of cable tray assembly 202b is positioned within the channel 248 of the guide rail 242 of the first splice bracket 232 so that a bottom surface 204a of the rail 204 contacts the piercing members 30 extending from the leg 14 facing in the second direction. A channel 248 in the rail guide 244 of the second splice bracket 234 is positioned on a top side 204b of the rail 204 of cable tray assembly 202a, and channel 248 in the rail guide 242 of the second splice bracket 234 is positioned on a top side of the rail 204 of cable tray assembly 202b. In this exemplary embodiment, the fastener assembly 236 includes a bolt 260, a nut 262 and a washer 264, where the bolt 260 is passed through the aperture 246 in the first splice bracket 232 and through the aperture 246 in the second splice bracket 234, as seen in FIG. 23. The washer 264 is inserted onto the free end of the bolt 260 and the nut 262 is threaded onto the bolt 260 and tightened. As the nut 262 is tightened, the piercing members 30 in contact with the protective coating on the first splice bracket 232 and the rails 204 cut through or pierce the protective coatings, similar to that shown in FIG. 14C, until the piercing members 30 contact the bare metal beneath the protective coatings to form an electrically conductive path between the rails 204 and the first splice bracket 232.

Continuing to refer to FIGS. 21-28, to join the rail 206 of cable tray assembly 202a to the rail 204 of cable tray assembly 202b, a bonding clip 10 is first inserted into each channel 248, seen in FIG. 26, in the guide rails 242 and 244 of the first splice bracket 232 so that the piercing members 30 of the legs 14 and 16 extending in the first direction contact an inner surface 242a or 244a in the guide rails 242 and 244 respectively, as shown in FIGS. 23 and 26. As shown in FIGS. 21 and 23, the end of the rail 206 of cable tray assembly 202a is positioned within the channel 248 of the guide rail 244 of the first splice bracket 232 so that a bottom surface 204a of the rail 204 contacts the piercing members 30 extending from the leg 14 facing in the second direction. Similarly, the rail 204 of cable tray assembly 202b is positioned within the channel 248 of the guide rail 242 of the first splice bracket 232 so that a bottom surface 204a of the rail 204 contacts the piercing members 30 extending from the leg 14 facing in the second direction. A channel 248 in the rail guide 244 of the second splice bracket 234 is positioned on a top side 204b of the rail 206 of cable tray assembly 202a, and channel 248 in the rail guide 242 of the second splice bracket 234 is positioned on a top side of the rail 204 of cable tray assembly 202b. The bolt 260 of the fastener assembly 236 is passed through the aperture 246 in the first splice bracket 232 and through the aperture 246 in the second splice bracket 234, as seen in FIG. 23. The washer 264 is inserted onto the free end of the bolt 260 and the nut 262 is then threaded onto the bolt 260 and tightened. As the nut 262 is tightened, the piercing members 30 in contact with the protective coating on the first splice bracket 232, the rail 204 and the rail 206 cut through or pierce the protective coatings, similar to that shown in FIG. 14C, until the piercing members 30 contact the bare metal beneath the protective coatings to form an electrically conductive path between the rail 204, the rail 206 and the first splice bracket 232. When one end of at least one rail 204 or 206 in the cable management system 200 is properly connected to earth ground, the electrically conductive path between the rails 204 and 206 and the first splice brackets 232 facilitate bonding the cable management system 200.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A bonding clip for bonding metal structures that are joined together with metal splice brackets, the bonding clip comprising:
   an electrically conductive body having a first side edge, a second side edge, a first end edge and a second end edge;
   an electrically conductive first leg extending from the first edge of the body adjacent the first end edge, the first leg having at least one piercing member extending from the first leg in a first direction;

an electrically conductive second leg extending from the first edge of the body adjacent the second end edge, the second leg having at least one piercing member extending from the second leg in the first direction, wherein the second leg is separated from the first leg; and an electrically conductive mounting member extending from the second side edge of the body.

2. The bonding clip according to claim 1, wherein the first leg has at least one piercing member extending from the first leg in a second direction.

3. The bonding clip according to claim 2, wherein the second leg has at least one piercing member extending from the second leg in the second direction.

4. The bonding clip according to claim 1, wherein the at least one piercing member extending from the first leg and the at least one piercing member extending from the second leg comprises a tooth-like projection that can penetrate protective coatings on the metal structure.

5. The bonding clip according to claim 4, wherein the tooth-like projection comprises a raised surface having a central opening forming a rim, the rim having at least one sharp edge.

6. The bonding clip according to claim 1, wherein the electrically conductive mounting member comprises a U-shaped member.

7. The bonding clip according to claim 1, wherein the electrically conductive mounting member comprises one or more gripping members used to grip the metal structure.

8. The bonding clip according to claim 1, wherein the electrically conductive body comprises a plurality of perforations extending at least from the first side edge to the second side edge of the electrically conductive body.

9. A bonding clip for bonding metal structures that are joined together with metal splice brackets, the bonding clip comprising:

an electrically conductive body having at least one electrically conductive wall, each at least one wall having a first side edge, a second side edge, a first end edge and a second end edge;

an electrically conductive first leg extending from the first edge of the at least one wall adjacent the first end edge, the first leg having at least one piercing member extending from the first leg in a first direction and at least one piercing member extending from the first leg in a second direction;

an electrically conductive second leg extending from the first edge of the at least one wall adjacent the second end edge, the second leg having at least one piercing member extending from the second leg in the first direction and at least one piercing member extending from the second leg in the second direction, wherein the second leg is separated from the first leg; and an electrically conductive mounting member extending from the second side edge of the body.

10. The bonding clip according to claim 9, wherein the at least one piercing member extending from the first leg in the first direction and the at least one piercing member extending from the first leg in the second direction comprises a tooth-like projection that can penetrate protective coatings on the metal structure.

11. The bonding clip according to claim 10, wherein the tooth-like projection comprises a raised surface having a central opening forming a rim, the rim having at least one sharp edge.

12. The bonding clip according to claim 9, wherein the at least one piercing member extending from the second leg in the first direction and the at least one piercing member extending from the second leg in the second direction comprises a tooth-like projection that can penetrate protective coatings on the metal structure.

13. The bonding clip according to claim 12, wherein the tooth-like projection comprises a raised surface having a central opening forming a rim, the rim having at least one sharp edge.

14. The bonding clip according to claim 9, wherein the electrically conductive mounting member comprises a U-shaped member.

15. The bonding clip according to claim 9, wherein the electrically conductive mounting member comprises one or more gripping members used to grip the metal structure.

16. The bonding clip according to claim 9, wherein the electrically conductive body comprises a plurality of perforations extending at least from the first side edge to the second side edge of the electrically conductive body.

17. A bonding clip for bonding metal structures that are joined together with metal splice brackets, the bonding clip comprising:

an electrically conductive body having a first side wall, a second side wall, a first leg between the first and second side walls and a second leg between the first and second side walls, the second leg being separated from the first leg so that a gap is formed between the first and second legs;

at least one piercing member extending from the first leg in a first direction;

at least one piercing member extending from the second leg in the first direction;

a first electrically conductive mounting member extending from the first side wall; and a second electrically conductive mounting member extending from the second side wall.

18. The bonding clip according to claim 17, further comprising at least one piercing member extending from the first leg in a second direction.

19. The bonding clip according to claim 18, further comprising at least one piercing member extending from the second leg in the second direction.

20. The bonding clip according to claim 17, wherein the at least one piercing member extending from the first leg and the at least one piercing member extending from the second leg comprises a tooth-like projection that can penetrate protective coatings on the metal structure.

21. The bonding clip according to claim 20, wherein the tooth-like projection comprises a raised surface having a central opening forming a rim, the rim having at least one sharp edge.

22. The bonding clip according to claim 17, wherein the first and second electrically conductive mounting members comprise a U-shaped member.

23. The bonding clip according to claim 17, wherein the first and second electrically conductive mounting members comprise one or more gripping members used to grip the metal structure.

* * * * *